United States Patent [19]
Watkins et al.

[11] Patent Number: 5,263,142
[45] Date of Patent: Nov. 16, 1993

[54] INPUT/OUTPUT CACHE WITH MAPPED PAGES ALLOCATED FOR CACHING DIRECT (VIRTUAL) MEMORY ACCESS INPUT/OUTPUT DATA BASED ON TYPE OF I/O DEVICES

[75] Inventors: John Watkins, Sunnyvale; David Labuda, Half Moon Bay; William C. Van Loo, Palo Alto, all of Calif.

[73] Assignee: Sun Microsystems, Inc., Mountain View, Calif.

[21] Appl. No.: 999,193

[22] Filed: Dec. 28, 1992

Related U.S. Application Data

[63] Continuation of Ser. No. 508,979, Apr. 12, 1990, abandoned.

[51] Int. Cl.⁵ .................. G06F 12/08; G06F 13/00
[52] U.S. Cl. .................. 395/425; 364/243; 364/DIG. 1
[58] Field of Search ... 364/200 MS File, 900 MS File; 395/425

[56] References Cited

U.S. PATENT DOCUMENTS

| | | | |
|---|---|---|---|
| 4,783,736 | 11/1988 | Ziegler et al. | 395/425 |
| 4,800,489 | 1/1989 | Moyer et al. | 395/425 |
| 4,853,846 | 8/1989 | Johnson et al. | 395/325 |
| 5,008,813 | 4/1991 | Crane et al. | 395/425 |
| 5,016,168 | 5/1991 | Liu | 395/375 |
| 5,091,850 | 2/1992 | Culley | 395/400 |
| 5,161,219 | 11/1992 | Nicholson et al. | 395/425 |

OTHER PUBLICATIONS

80386 A programming and Design Handbook (2nd edition), Penn Brumm and Don Brumm (Authors), 1989, Chapters 4 and 13.

*Primary Examiner*—Joseph L. Dixon
*Assistant Examiner*—Matthew Kim
*Attorney, Agent, or Firm*—Blakely, Sokoloff, Taylor & Zafman

[57] ABSTRACT

An I/O cache is provided to a computer system comprising a main memory and a number of DVMA/DMA I/O devices for caching I/O data between the main memory and the DVMA/DMA I/O devices. The I/O cache selectively caches the I/O data in accordance to the device class types of the DVMA/DMA devices. The I/O cache comprises an I/O cache data array, an I/O cache address tag array, an I/O cache mapper, and I/O cache control logic. The I/O cache data array comprises a number I/O cache lines, each having a number of I/O cache blocks, for storing I/O data between the main memory and the DVMA/DMA devices. The I/O cache tag comprises a number of corresponding I/O cache address tag entries, each having a number of I/O cache address tags and associated control information, for storing address and control information for the I/O data stored in the I/O cache lines. The I/O cache mapper maps the dynamically or statically allocated I/O buffers in main memory of each DVMA/DMA device having a cacheable device class type to a set of dynamically or statically assigned unique I/O cache buffers in the I/O cache data array, thereby ensuring that no two DVMA/DMA devices with cacheable I/O data will share the same I/O cache block. The I/O control logic controls accesses, indexes and updates to the I/O cache mapper, the I/O cache tag and data arrays.

5 Claims, 14 Drawing Sheets

I/O CACHE BLOCK DIAGRAM

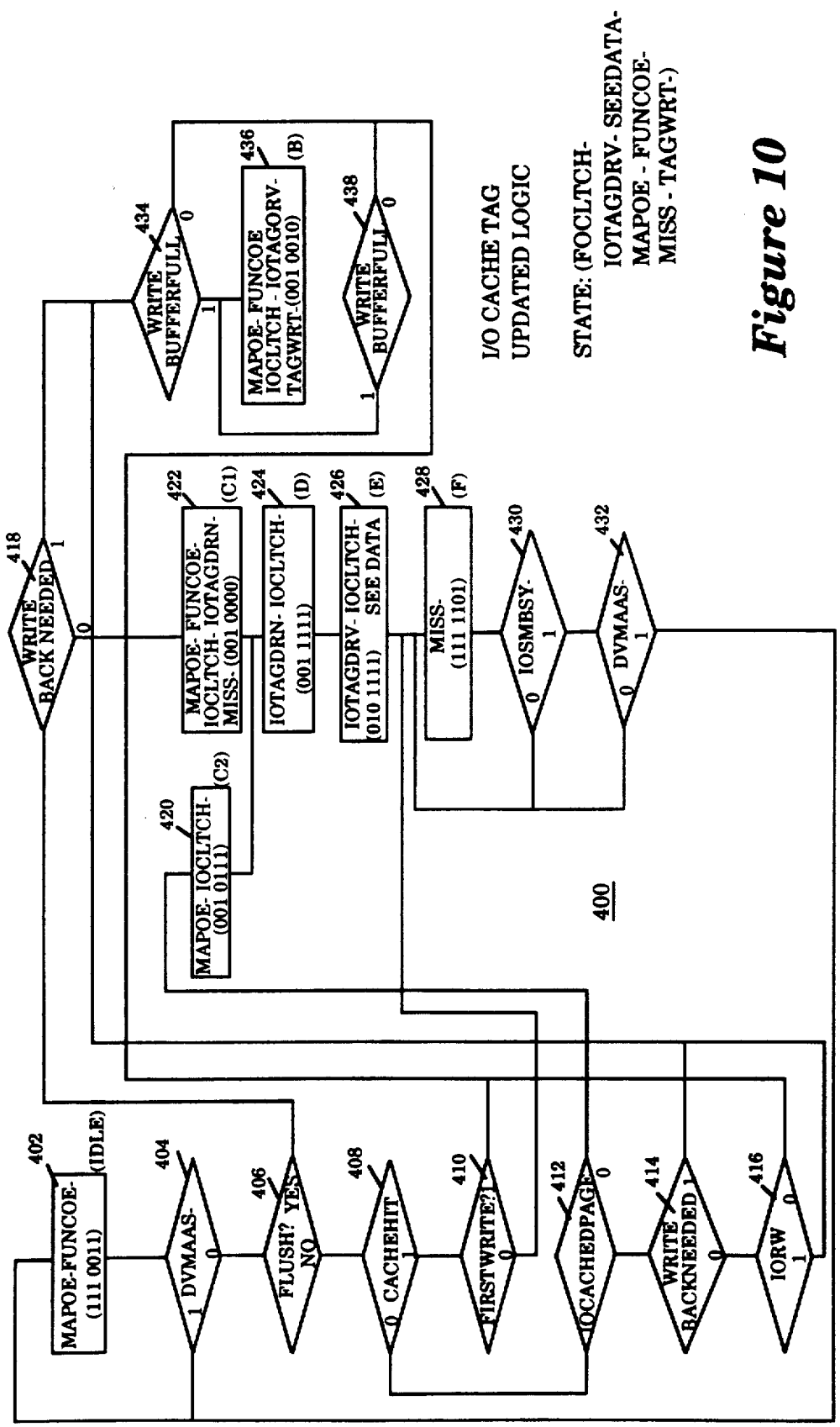

INPUT/OUTPUT CACHE WITH MAPPED PAGES ALLOCATED FOR CACHING DIRECT (VIRTUAL) MEMORY ACCESS INPUT/OUTPUT DATA BASED ON TYPE OF I/O DEVICES

This is a continuation of application Ser. No. 07/508,979, filed Apr. 12, 1990 now abandoned.

RELATED APPLICATION

This application is related to U.S. patent application, Ser. No. 07/879,162, filed on Apr. 30, 1992, which is a continuation application of U.S. patent application, Ser. No. 07/508,939, filed on Apr. 12, 1990.

BACKGROUND OF THE INVENTION

Field of the Invention

The present invention is related to the field of computer systems. More specifically, the present invention is related to caching input/output data between main memory and direct (virtual) memory access devices.

Traditionally, control of data movement between the external devices and the main memory subsystem is typically done in either of two ways. First, data movement can be controlled by the CPU directly reading from the device (to internal CPU registers) or writing from registers to the device. This type of control is called Programmed I/O. The second type of control is with data movement being controlled, for the most part, by the external device itself. This type of control is called Direct Memory Access, or, if the device accesses memory through virtual addresses (as is the case in the preferred embodiment), Direct Virtual Memory Access (DVMA). Coordination between the external device and the CPU is typically handled either by message passing or through interrupts.

In a typical computer system configuration, the DVMA data is transferred to the memory subsystem over the same data paths which are normally used by the CPU. In particular, this includes the optional central cache. The central cache is designed as a fast access temporary buffer of either instructions or data or both. Sharing the central cache between DVMA devices and the CPU creates three effects. First, the most important, only one device can access the central cache at one time. This implies that heavy I/O data transfers through DVMA will reduce, potentially in a significant manner, the effective cache bandwidth seen by the CPU. Second, the use of cache lines to temporarily buffer DVMA data precludes their use for CPU instructions or data, resulting in lower CPU cache "hit" rates. Third, when DVMA devices write to memory through the central cache, the cache block used to buffer the DVMA data is shared with the CPU and other DVMA devices. Therefore, the possibility always exists that the cache block used by the DVMA device may be displaced from the central cache by a miss caused by an access to the same address from either the CPU or another DVMA device. In such a case, the cache block could be written back as a partially filled line. A read-then-write back approach assures that modified data in a partially filled block is properly written to main memory. A second approach to ensure that modified data is properly written is to record, with "byte marks", which bytes of data are modified within the cache block. At the time that data from the cache block is written back into main memory, only bytes indicated as modified with "byte marks" set are actually written into memory. However, this approach entails the addition of complex control logic and typically slows block write operations to memory.

Providing a separate I/O cache buffer for DVMA data may only partially correct the two problems noted above. The most significant problem posed with a separate write back I/O cache buffer is interference within the I/O cache, with multiplied devices trying to access data that maps to a single cache data buffer. This occurrence has a catastrophic effect on system performance. More specifically, the mapping algorithm used by write back caches typically uses the low order address bits of the access to determine which cache data buffer is used. This mechanism allows two distinct devices to perform operations that map to the same cache data buffer. The result is a direct conflict for the use of that cache data buffer, and performance that is potentially worse than if no cache were present. This problem can be addressed by adding associativity to the mapping algorithm for the cache, but that requires a significant increase in the cost and complexity of the cache element.

Additionally, data consistency must be maintained between the I/O and the central cache. Traditional solutions to this problem place the burden of maintaining consistency either on the operating system, which causes severe performance degradation, or on the system hardware, which also increases the cost and complexity of the cache design.

Thus, it is desirable to provide an I/O cache system to a computer system. It is further desirable that the I/O cache system facilitates a hardware and software combination solution to the data coherency problem which lessens the burden on the operating system, and yet requires minimal increases in the cost and complexity of the cache design. As will be disclosed, the I./O cache system for direct (virtual) memory access I/O devices of the present invention achieves these objects and desired results described above.

SUMMARY OF THE INVENTION

In the present invention, the forgoing problem is solved through a unique I/O cache which facilitates the use of a combination of hardware and software cache coherency support. The term "I/O cache" as used below will be meant to include not only a physical cache for temporarily buffering I/O data to and from external devices, but is also meant to include all associated control, the I/O cache tag array, and data paths, necessary to make the I/O cache functional.

DVMA device classifications

The I/O Cache of the present invention, assumes all DVMA or DMA I/O devices on the system are divided by the operating system into 3 classes. The I/O Cache further assumes that these classes of devices are each treated differently by the operating system, but all devices within a class are treated identically by the routines that support the I/O Cache operation.

Class 1 devices are characterized by their sequential I/O to a dynamic buffer in system memory. They are high throughput devices, such as magnetic disk and tape, and thus increased system performance can be achieved by properly caching their data in the I/O Cache. They always perform I/O via sequential DMA access to a specified buffer, and communicate with the operating system via shared memory outside the data buffer. In all cases, the data buffer used by a Class 1 device is dynamically allocated, so the operating system must allocate and deallocate the buffers for each operation.

Class 2 devices are characterized by their I/O to multiple, static data buffers. This class includes networking devices, which typically use a ring buffer scheme for sending and receiving network packets. Class 2 devices do not allocate and deallocate buffers per operation. Instead, a set of statically allocated data buffers is repeatedly used to perform I/O operations. These devices must perform sequential DMA within a data buffer, but they can be accessing several data buffers simultaneously in an interleaved fashion. Class 2 devices are also high throughput devices, so it is beneficial to system performance to have their data cached in the I/O Cache.

Class 3 devices are characterized by either non-sequential DMA accesses to their data buffers, or throughput that is too low to gain noticeable system performance from caching their data in the I/O Cache. The operating system is designed to have Class 3 devices bypass the I/O Cache entirely, so their data is never cached in the I/O Cache. Such data may or may not be cached in the Central Cache used by the CPU.

When DMA devices in any of the three classes employ a virtual addressing space, then these devices are called Direct Virtual Memory Access (DVMA) devices. Within the preferred embodiment, all I/O devices which are the subject of this description are DVMA devices. However, this description may be modified to include Direct Memory Access (DMA) devices either as a substitute for DVMA devices or in conjunction with DVMA devices. DMA devices differ, conceptually, from DVMA devices only in their mechanisms to address data in main memory. DMA devices access memory using real (or physical) memory addresses; DVMA devices access memory through virtual memory addresses which are mapped to real addresses. The mechanism to accomplish this mapping in the preferred embodiment system is the I/O Mapper. The concepts of the I/O Cache, developed here for a system with DVMA devices, may be extended as well to a system supporting DMA devices.

Example of Class 1 devices in the preferred embodiment of the invention are devices connected to the system through a standard system bus, the VMEbus. An example of a Class 2 device in the preferred embodiment is the Intel Ethernet interface with supporting DVMA logic. Examples of Class 3 devices include slower speed (e.g., serial data communication) devices connected to the system through a standard system bus (VMEbus) interface.

I/O Cache Solutions for I/O Device Classes 1-3

The I/O cache design provides an efficient mechanism for solving the problem of cache inefficiencies caused by I/O device interference. For all Class 1 devices which share a common DVMA virtual address space, the operating system dynamically maps devices so that at any moment, each device is mapped to a set of pages which is unique to that device. The I/O cache uses this property to define the cache mapping: each Class 1 device within a DVMA address space is mapped such that the set of pages dynamically assigned to that device maps to a corresponding unique set of I/O cache buffers for the device. Secondly, in the event that the system supports multiple DVMA address spaces for Class 1 devices, the mapping for each DVMA address space into the I/O cache is unique from that of any other DVMA address space. The specific mapping for the preferred embodiment is described later.

For Class 2 devices, each class 2 device is assigned to a set of I/O cache buffers which are unique from those of any other Class 2 device. Furthermore, these I/O cache buffers are, in turn, unique from the set of buffers assigned to Class 1 devices.

As a consequence, the I/O cache has the property that within the I/O cache, each Class 1 and Class 2 DVMA device transfers to its own dynamically (or statically) assigned buffer line, so that no two devices share the same I/O cache block. Since no two DVMA devices share the same I/O cache block, it is not necessary to account for the possibility that a partially filled cache block might be unexpectedly written back to memory. Partially filled blocks at the start or end of a transfer sequence are handled by operating system conventions. These ensure that partially filled blocks of DVMA data are always mapped to an address in which the unmodified bytes for that block may be masked off and ignored.

Class 3 DVMA devices are marked as non-I/O cacheable. Transfer to and from these devices are handled through the central cache and memory subsystem while bypassing the I/O cache.

Other Operating System Supports Assumptions

The three different strategies supported by the I/O cache hardware for mapping I/O access to I/O cache lines assumes the following supports from the operating system modules that support the I/O cache operation.

To support the strategy used for Class 1 devices, the strategy assumes the I/O buffer memory is allocated and deallocated by the operating system on a per operation basis. This allows the buffer addresses for each operation to be solely dedicated to that operation, so each line in the I/O cache is accessed by only one device at a time. The strategy relies on the operating system to set and reset the I/O cacheable bit for mappings to the data buffers for Class 1 devices. When the software controlling a specific device (commonly called the device driver) tries to allocate a data buffer, the operating system sets the IOC bit in the mappings to that buffer only if the device doing the I/O is a Class 1 device. In the preferred embodiment, there are also addressing alignment restrictions supported by the operating system in order to set the IOC bit, but those are not required by the concept of the invention. (Specifically, these restrictions enable an implementation which eliminates the need for writing back partially modified blocks of data into memory. An alternate implementation may add hardware and/or software controls to handle, by some alternate means, the copying of partially modified blocks into memory.) It is further assumed that the same operating system module will flush any relevant data out of the I/O cache and reset the state of the IOC bit in the mappings to that I/O buffer when the I/O is complete and the buffer deallocated. The address and size of the I/O buffer is used by the operating system to calculate which I/O cache lines may contain relevant data, and issues a flush operation to each of the I/O cache lines before the buffer is deallocated.

To supper the strategy used for Class 2 devices, the strategy assumes that the I/O cache management for a device is performed by the operating system module that control that device, commonly known the device driver of the device. When the data buffers are statically allocated at startup time, the mappings to those buffers are marked I/O cacheable by the driver. Since the buffers are static, these mappings never change. Also, it is assumed that the device driver code that processes the completion of an I/O operation will flush the appropriate line or lines of the I/O cache. (Within the preferred embodiment, the Ethernet interface is a Class 2 device which is assigned two I/O cache lines: one for all read data and one for all write data. The correct cache line to flush is easily calculated using the direction of the Ethernet operation to choose between the two lines dedicated to that device.) Because of the design of the I/O cache hardware, the operating system may perform this flush even after a new I/O operation has begun accessing data in that same line of the i/O cache, so there are no real-time support assumed. The only assumption is that the I/O cache line will be flushed before the operating system attempts to use the data in the I/O buffer as the completed data from an I/O operation.

To support the strategy used for Class 3 device, the strategy assumes that the IOC bits on mappings to I/O buffers for Class 3 devices are always reset by the operating system. The operating system may easily accomplish this by making that the default state for the IOC bit, so that only I/O buffers that are used by Class 1 or 2 devices ever have their IOC bits set. It is further assumed that the operating system also insures that the IOC bit is reset on data buffers used by Class 1 devices before those buffers are deallocated, so subsequent use of a buffer by a Class 3 device will be non-I/O cacheable.

BRIEF DESCRIPTION OF THE DRAWINGS

FIG. 10 is a flow diagram of tag update logic for the I/O cache which describes the controls for updating tags in the I/O Cache.

DETAILED DESCRIPTION OF THE INVENTION

Figure 1A:
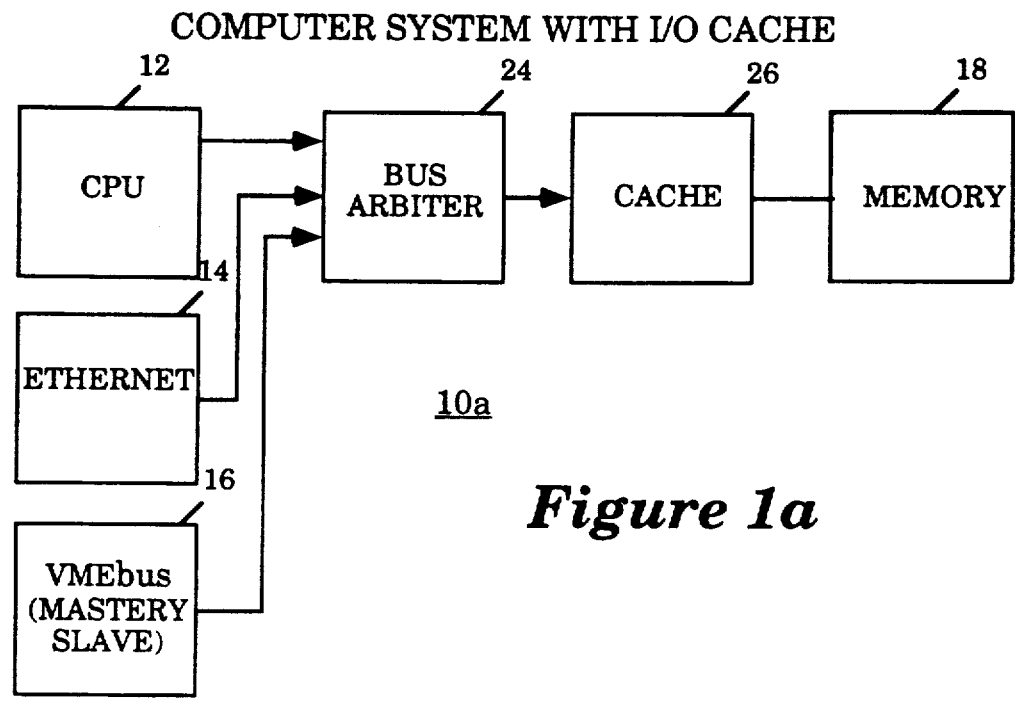
FIG. 1a is a block diagram showing the basic system elements in a computer system without an I/O cache.

FIG. 1 compares the most fundamental elements of a cache based computer system 10' without an I/O Cache with those of a system 10 with an I/O cache. In the computer system 10' without an I/O cache, FIG. 1a, three devices, a Central Processing Unit (or CPU) 12 together DVMA devices coupled the two DVMA device interfaces 14 and 16, compete for access to a high speed Central Cache and Memory subsystem, 26 and 18, through a Central Cache Bus Arbiter 24. The two DVMA device interfaces 14 and 16 shown are an Ethernet network transceiver and controller 14, and a VMEbus Slave interface 16. (In typical configurations, the CPU 12 also utilizes a VMEbus Master interface 16 to directly access devices on the VMEbus 16.) These DVMA devices, like the CPU 12, access programs and data from the memory subsystem 18 through the central cache 26. Note that while a central cache 26 is included in the computer system 10 and 10' being contrasted, the central cache 26 itself is optional and not a required system element to support a computer system with an I/O cache 10.

Within the system 10' without an I/O cache, the bus arbiter 24 typically grants default access priority to the CPU 12. In their use of the central cache 26, the DVMA devices detract from the CPU performance in at least two basic ways. First, the arbiter's granting bus mastership to a DVMA device reduces the CPU's cache band width. Second, the use of the central cache 26 for a combination of both DVMA data and cache data reduces the data storage space in the central cache 26 which is available for CPU data, decreasing the CPU's cache "hit" rate.

(Note: a CPU 12 or DVMA device is said to have a "cache hit" if the central cache 26 contains the data desired by the CPU 12 or DVMA device. This is typically indicated by a comparison of either the virtual or real address of the CPU 12 with the address of the data stored in the central cache 26. The "hit" criteria for the central cache 26 within the preferred embodiment will be described later. Note that in general, it is possible to have a CPU 12 or DVMA device "hit" the central cache 26 yet still denied access to the data in the cache. This situation can arise because of a protection violation. Typical examples of protection violations include an attempt to write to a line whose page is write protected, and an attempt by a user program to access a page which is protected for system access only. Again, the presence or absence of protection mechanism does not alter the fundamental concepts of the I/O cache of the present invention.)

Figure 1B:
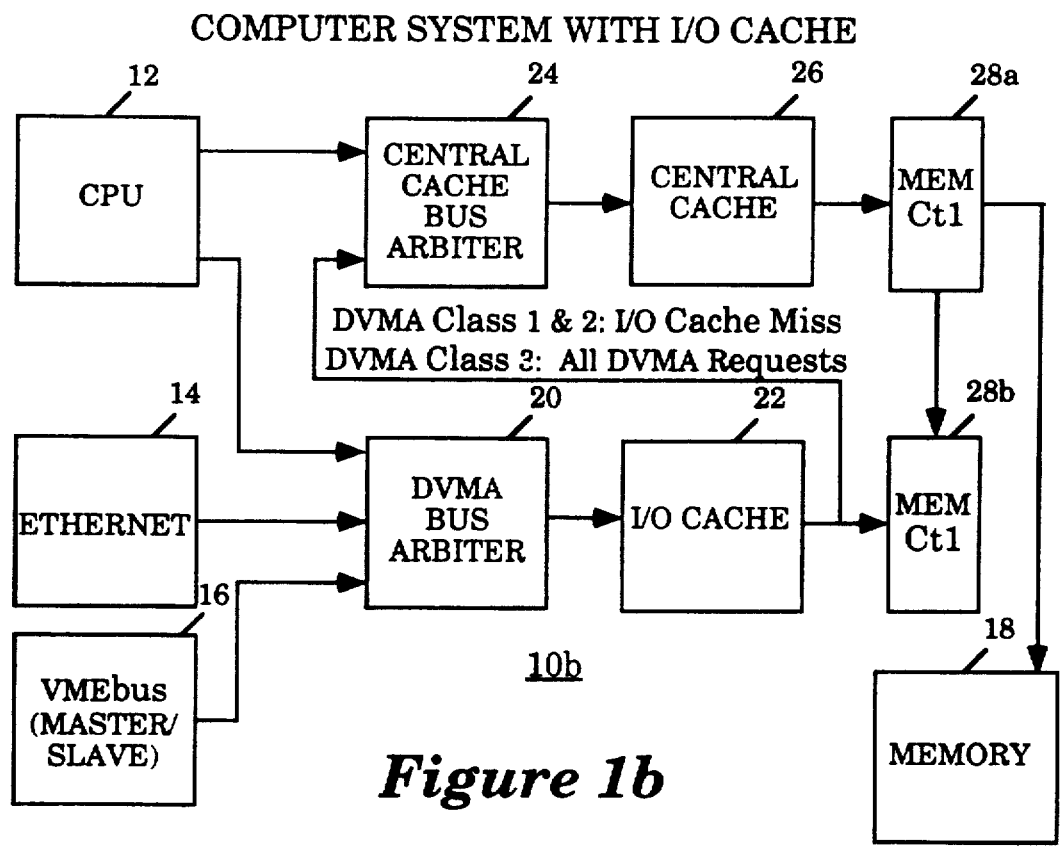
FIG. 1b is a block diagram showing the basic system elements in a computer system with an I/O Cache.

The computer system 10 including an I/O cache, FIG. 1b, has at least four additional components added to the system configuration. First, a DVMA Bus Arbiter 20, is added to arbitrate access to the I/O cache 22 between the DVMA devices and the CPU 12. Typically, Class 3 DVMA devices will issue requests to access the central cache 26, and Class 1 and Class 2 DVMA devices may access the central cache 26 for data consistency checks. The frequency of these checks depends on the data consistency mechanism employed for the I/O cache 22. The dependent data coherency mechanism will only be briefly described to the extent necessary to understand the various elements of the I/O cache of the present invention. For a more detailed description of the dependent data coherency mechanism, see the related application.

Second, the system 10 includes the I/O cache 22 itself. Third, the system 10 includes the necessary control logic (not shown) to operate the I/O cache 22. This may include logic to detect an I/O cache "miss", to create a DVMA request to the central cache arbiter 24 to handle this miss, and to download a modified I/O cache block, if present, into a write back buffer. Fourth, the I/O cache 22 may include a DVMA data path directly to main memory, operating in parallel with the CPU data path, together with the necessary controls to coordinate the two memory interfaces 28a and 28b.

The I/O Cache 22 of the present invention assumes all DVMA or DMA I/O devices on the system are divided by the operating system into 3 classes. The I/O Cache 22 further assumes that these classes of devices are each treated differently by the operating system, but all devices within a class are treated identically by the routines that support the I/O Cache operation.

Class 1 devices are characterized by their sequential I/O to a dynamic buffer in system memory. They are high throughput devices, such as magnetic disk and tape, and thus increased system performance can be achieved by properly caching their data in the I/O Cache 22. They always perform I/O via sequential DMA access to a specified buffer, and communicate with the operating system via shared memory outside the data buffer. In all cases, the data buffer used by a Class 1 device is dynamically allocated, so the operating system must allocate and deallocate the buffers for each operation.

Class 2 devices are characterized by their I/O to multiple, static data buffers. This class includes networking devices, which typically use a ring buffer scheme for sending and receiving network packets. Class 2 devices do not allocate and deallocate buffers per operation. Instead, a set of statically allocated data buffers is repeatedly used to perform I/O operations. These devices must perform sequential DMA within a data buffer, but they can be accessing several data buffers simultaneously in an interleaved fashion. Class 2 devices are also high throughput devices, so it is beneficial to system performance to have their data cached in the I/O Cache 22.

Class 3 devices are characterized by either non-sequential DMA accesses to their data buffers, or throughput that is too low to gain noticeable system performance from caching their data in the I/O Cache 22. The operating system is designed to have Class 3 devices bypass the I/O Cache 22 entirely, so their data is never cached in the I/O Cache 22. Such data may or may not be cached in the Central Cache 26 used by the CPU 12.

When DMA devices in any of the three classes employ a virtual addressing space, then these devices are called Direct Virtual Memory Access (DVMA) devices. Within the preferred embodiment, all I/O devices which are the subject of this description are DVMA devices. However, this description may be modified to include Direct Memory Access (DMA) devices either as a substitute for DVMA devices or in conjunction with DVMA devices. DMA devices differ, conceptually, from DVMA devices only in their mechanisms to address data in main memory. DMA devices access memory using real (or physical) memory addresses; DVMA devices access memory through virtual memory addresses which are mapped to real addresses. The mechanism to accomplish this mapping in the preferred embodiment system is the I/O Mapper. The concepts of the I/O Cache 22, developed here for a system with DVMA devices, may be extended as well to a system supporting DMA devices.

Examples of Class 1 devices in the preferred embodiment of the invention are devices connected to the system through a standard system bus, the VMEbus. An example of a Class 2 device in the preferred embodiment is the Intel Ethernet interface with supporting DVMA logic. Examples of Class 3 devices include slower speed (e.g., serial data communication) devices connected to the system through a standard system bus (VMEbus) interface.

Figure 2A:
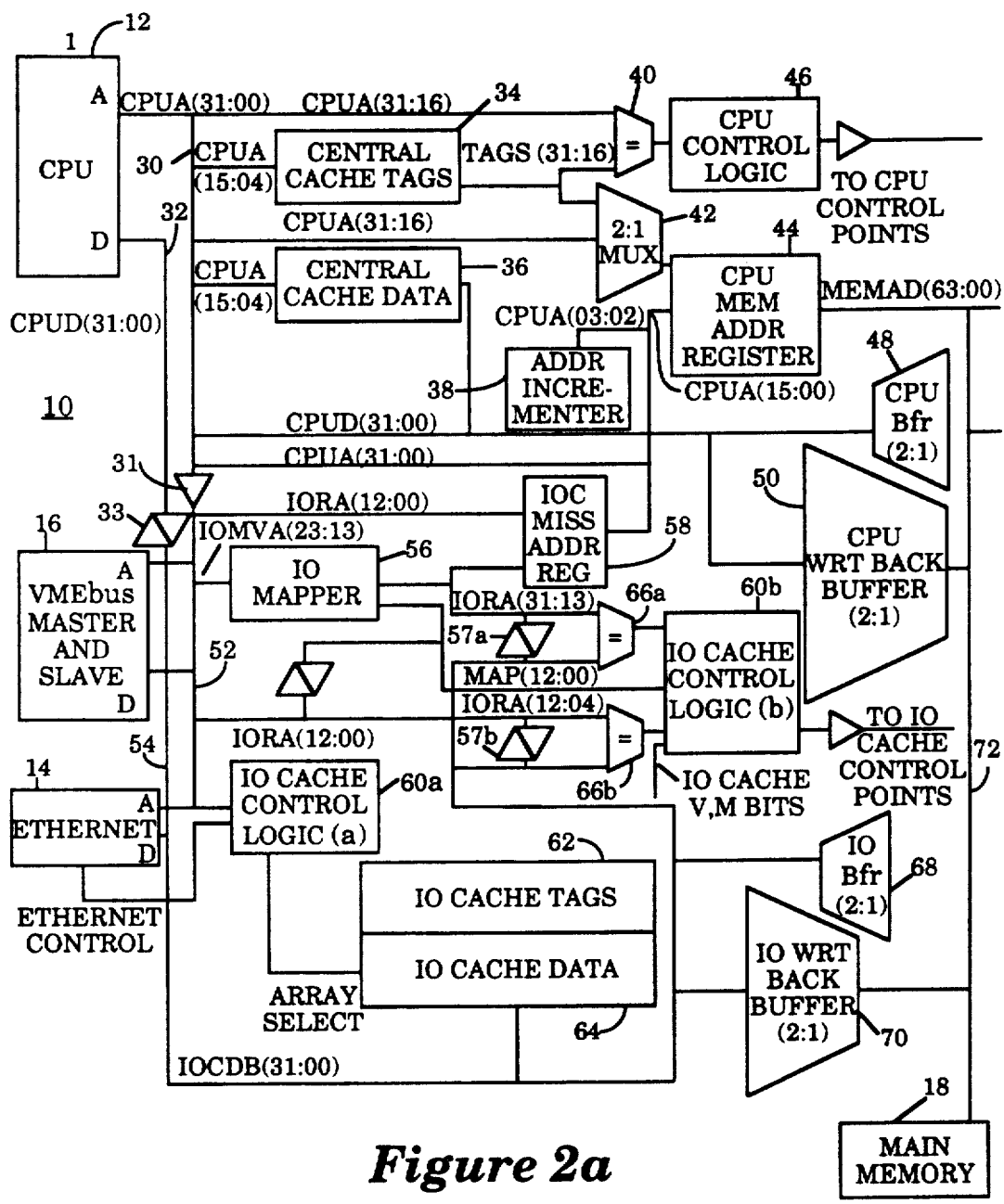
FIG. 2a is a detailed overall block diagram of major functional elements in a computer system which incorporates an I/O cache.

FIG. 2a shows in more detail the functional blocks in a computer system in which the present invention is implemented. The CPU and memory subsystem includes a microprocessor or Central Processing Unit (CPU) 12 with its address buffer and data transceiver, CPU Address and Data busses 30 and 32, the Central Cache Tag and Data Arrays 34 and 36, an Address Incrementer 38, a Central Cache Tag Address Comparator 40, a CPU Memory Address Multiplexer 42, a CPU Memory Address Register 44, CPU Control Logic 46, a CPU Input Data Buffer (labeled CPU Bfr) 48, a CPU Write Back Buffer (labeled CPU Wrt Back Buffer) 50, a CPU to DVMA Data Transceiver 33, a CPU to DVMA Address Buffer 31, a Memory Bus 72, and Main Memory 18. The I/O subsystem includes a VMEbus Master and Slave interface 16 with its address buffer and data transceiver, an Ethernet Network DVMA interface 14 with its address buffer and data transceiver, a DVMA Address and Data bus 52 and 54, an I/O Mapper 56, an I/O Cache Miss Address Register 58, I/O Cache Control Logic 60a and 60b to both address and control the I/O Cache and to control other DVMA logic, the I/O Cache Tag and Data Arrays 62 and 64, the I/O Cache Address Comparators 66a and 66b, to compare both the high order address (Page Address) and the Block identity within a page, an I/O Cache Address to Data Buffer 57a and 57b, an I/O Cache Input Data Buffer (labeled IO Bfr) 68, and an I/O Cache Write Back Buffer (labeled IO Wrt Back Buffer) 70. A number of components of the CPU and memory subsystem also play a role in DVMA operations.

Figure 2B:
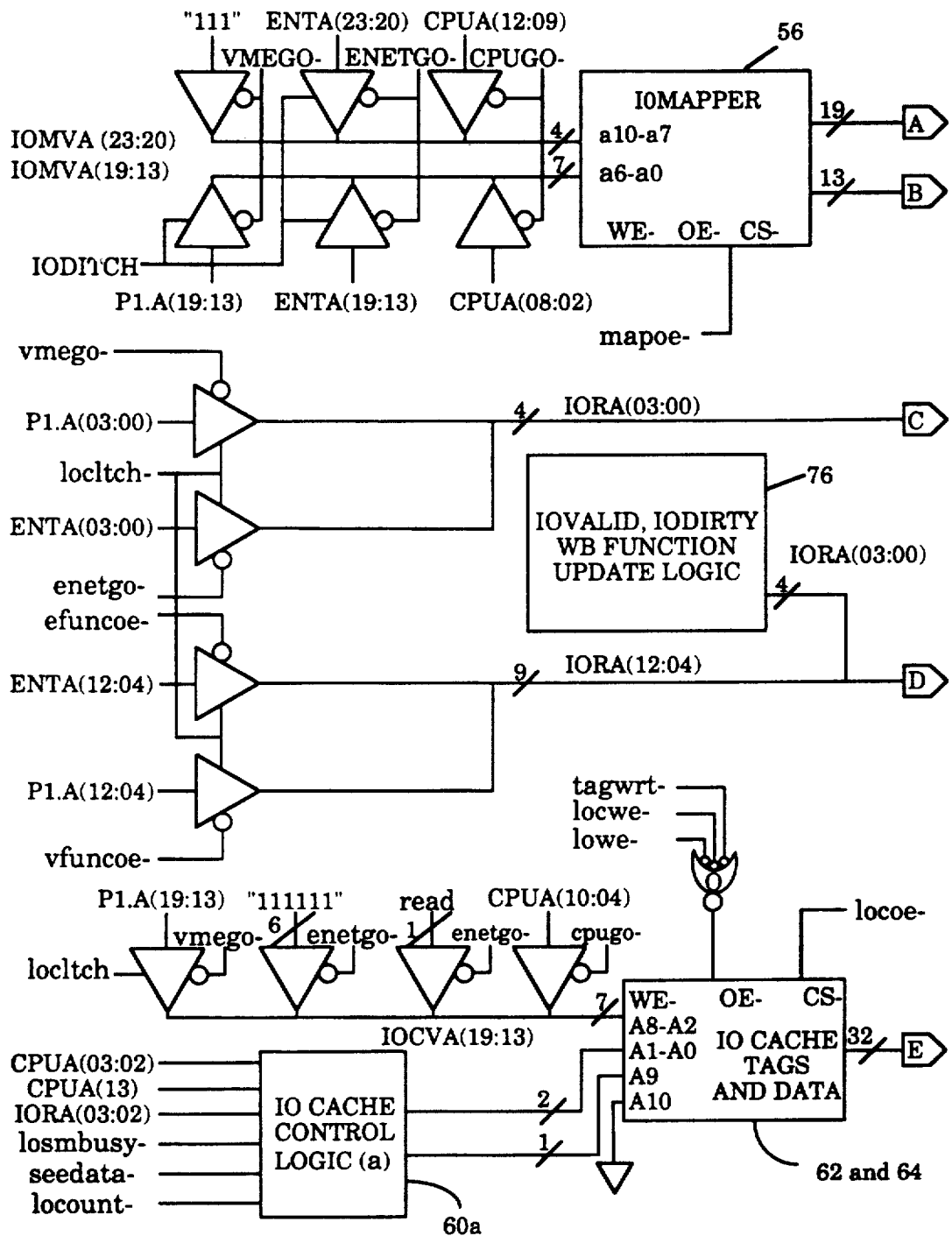
FIGS. 2b and 2c are detailed overall block diagrams of the major functional elements of the I/O cache itself.
Figure 2C:
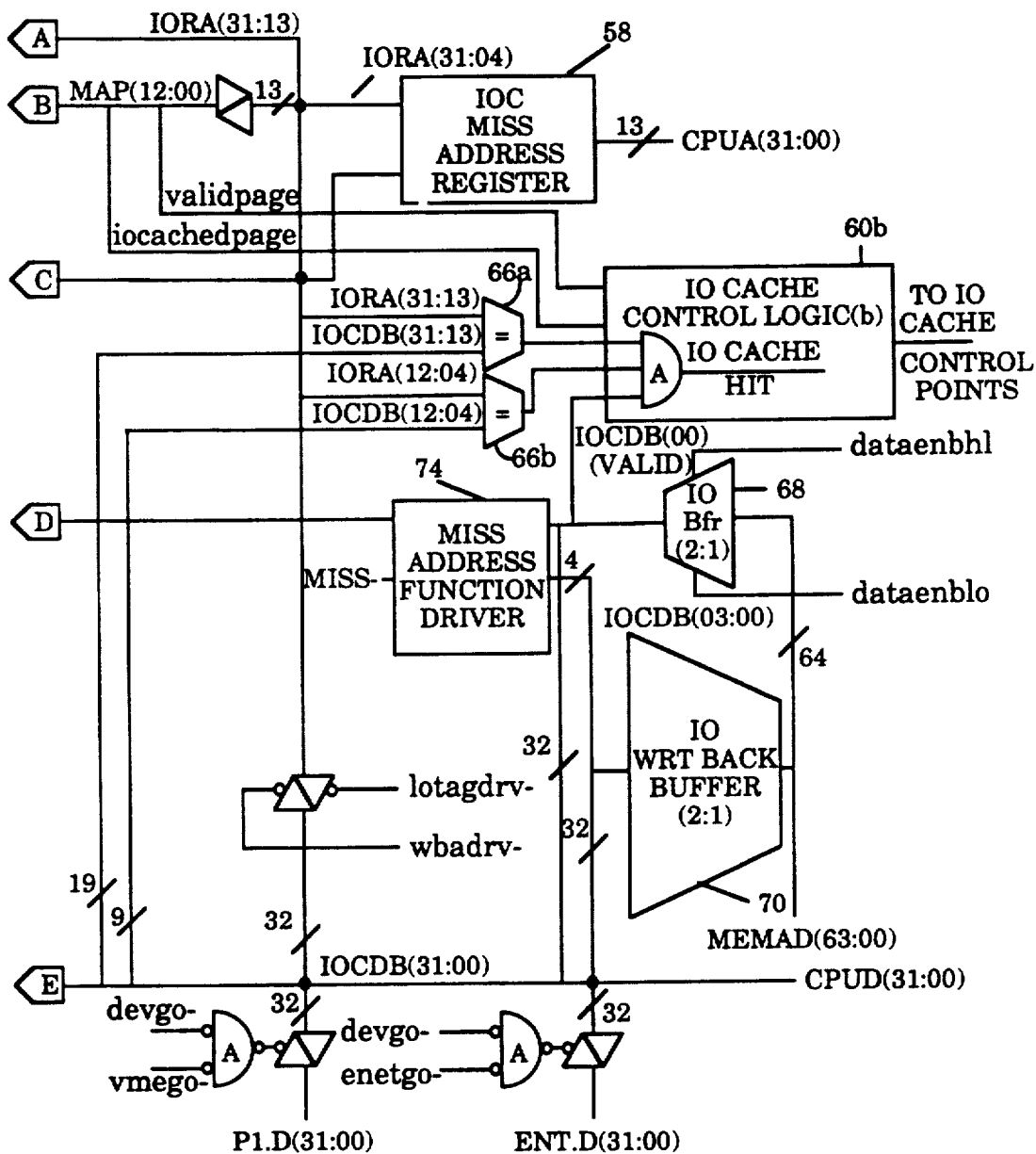

FIGS. 2b and 2c show the I/O Cache subsystem in more detail. There are two added functional blocks shown in these diagrams: the Miss Address Function Driver 74; and the IOvalid, IOdirty, Write Back Function Update 76 Logic. In addition, the usage of control signals set by the state machine flow charts (in later figures) is also shown.

Description of the Elements of a System with an I/O Cache: the CPU Cache Subsystem Referring back to FIG. 2a, CPU 12 issues bus cycles to address instructions and data in memory and possibly other system devices. The CPU address itself is a real address of (A) bits in size which uniquely identifies bytes of instructions or data. The CPU bus cycle may be characterized by one or more control fields to uniquely identify the bus cycle. In particular, a Read/Write indicator is required, as well as a "Type" field. This field identifies the memory address and data space as well as the access priority (i.e., "Supervisor" or "User" access priority) for the bus cycle. A CPU 12 which may be utilized in a computer system having real addressing and capable of supporting a multi-user operating system is a Motorola MC68030. Note that the Motorola MC68030 has an integral Memory Management Unit, and consequently presents real (or physical) addresses to the CPU Address Bus 30.

The CPU 12 is interconnected with other system devices and local device busses through the CPU Address and Data busses 30 and 32. The Address bus 30 is a real address bus 32 bits in width. The CPU Data bus 32 is also 32 bits in width.

The cache subsystem has meaning, insofar as the present invention is concerned, only in that DVMA data may reside in this cache. If this is the case, then DVMA Class 3 devices need the Central Cache 34 and 36 and its controls to source data, and DVMA Class 1 and Class 2 devices need the Central Cache 34 and 36 to provide data consistency for the I/O subsystem.

Within the Central Cache 34 and 36, the Central Cache Data Array 36 is organized as an array of $2^{}N$ blocks of data, each of which contains $2^{}M$ bytes. The $2^{}M$ bytes within each block are uniquely identified with the low order M address bits. Each of the $2^{}N$ blocks is uniquely addressed as an array element by the next lowest N address bits.

The Central Cache Data Array 36 described herein is a "direct mapped" cache, or "one way set associative" cache. While this cache organization is used to illustrate the invention, it is not meant to restrict the scope of the invention, which may also be used in connection with multi-way set associative caches.

Another element required for the Central Cache 34 and 36 operation is the Central Cache Tag Array 34, which has one tag array element for each block of data in the Central Cache Data Array 36. The tag array thus contains $2^{**}N$ elements, each of which has a Valid bit (V), a Modified bit (M), and a real address field (RA). The contents of the real address field, together with low order address bits used to address the cache tag and data arrays, uniquely identify the cache block within the total real address space of (A) bits. That is, the tag real address field must contain at least $(A-(M+N))$ bits.

Figure 3A:
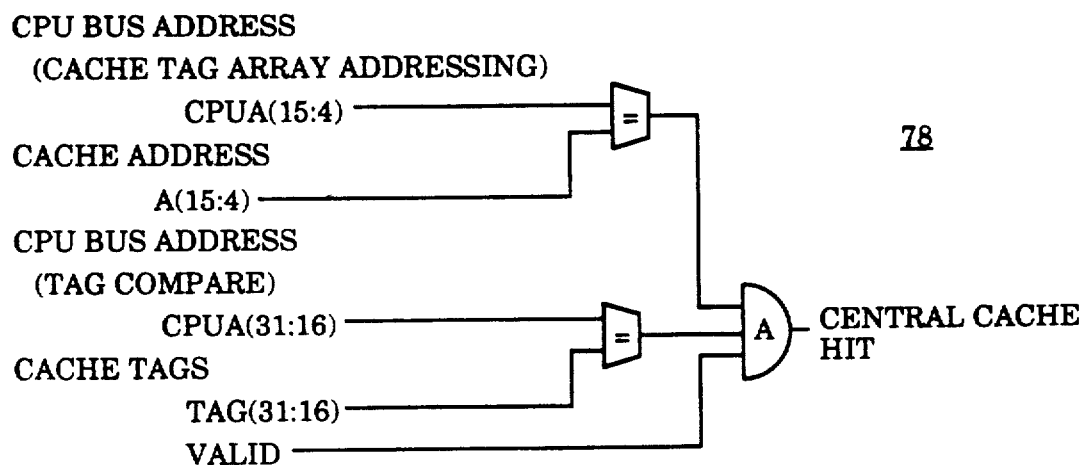
FIG. 3a is a diagram showing the cache "hit" logic for the central cache.

Central Cache "hit" logic compares the real addresses for cache accesses to the contents of the Central Cache Tag address field. Within the access address, the lowest order M bits address bytes within a block; the next lowest N bits address a block within the cache; and the remaining $(A-(M+N))$ bits compare with the tag real address field, as part of the cache "hit" logic. Logic for the Central Cache "hit" is shown in FIG. 3a. Protection checking for the real address cache is not necessary, since this can be accomplished at the time of address translation from virtual to real addresses, which is done within the I/O Mapper (56 in FIG. 2a and 2b) for DVMA cycles.

The system described herein utilizes a real address Central Cache 34 and 36. The use of a real address cache is not a requirement for the implementation of the present invention: a virtual address Central Cache, with the appropriate controls for protection checking and the detection of "alias" virtual addresses within the cache control logic, is another possible system configuration in which the present invention may be implemented. ("Alias" virtual addresses arise when two or more different virtual addresses map to the same real address.)

The Address Incrementer 38 controls the word addressing for data within the Central Cache Data Array 36. In the preferred embodiment, cache blocks are 16 bytes, or 4 words, in length. The Address Incrementer 38 controls the address generation of bits A(03:02) for the data array.

The CPU Memory Address Multiplexer 42 multiplexes the high order address bits TAGA(31:16) from the Central Cache 34 and 36 with the corresponding address bits CPUA(31:16) from the CPU Address Bus 30. The TAGA bus typically specifies a portion of a write back address, while CPUA(31:16) specifies a portion of a cache miss address. The multiplexer 42 sends the resulting address into the CPU Memory Address Register 44. This register receives its low order address bits from the CPU Address Bus 30, bits CPUA(15:00).

The CPU Memory Address Register 44 serves as the address interface to the Memory Bus 72 for all accesses to main memory 18. These accesses specifically include reading cache blocks, writing back modified cache blocks, and writing partially modified double words (selected bytes from 8 byte double words).

The CPU Control Logic 46 uses the results of the Central Cache Hit/Miss indication, as well as other information from the CPU and other system devices, to control the operation of that portion of the system related to the CPU 12.

The CPU Input Data Buffer 48 is a registered buffer for 64 bits of data from the Memory Bus 72. It multiplexes the data onto the CPU Data Bus 32 in 32 byte increments. On cache miss operations, the word miss address bit A(2) specifies which work from the CPU Input Data Buffer 48 is multiplexed onto the CPU Data Bus 32 first.

The CPU Write Back Buffer 30 is a buffering register for a full cache block which is loaded from the 32 bits CPU Data Bus 32 and drives the 64 bit Memory Bus 72. It is used to buffer modified cache blocks as well as partially modified double words to be written to memory.

The CPU to DVMA Data Transceiver 33 buffers data between the CPU Data Bus 32 and the DVMA Data Bus 54. As long as DVMA devices "hit" the I/O Cache 62 and 64, these two busses 32 and 54 and their controlling logic normally operate independently (that is, the buffers are disabled).

The CPU to DVMA Address Buffer 31 registers and buffers the address from the CPU 12 when it accesses devices which are on the DVMA Data Bus 54. These devices include the VMEbus Master interface 16 and the I/O Cache Tags and Data 62 and 64, for both diagnostic operations and cache flushing.

The Memory Bus 72 is a 64 bit multiplexed Address and Data bus. The CPU Memory Address Register 44 is the source for the memory address for both CPU and DVMA bus cycles, but the data buffers 48, 50, 68 and 70 for CPU and DVMA operations are independent. That is, data transfers for DVMA operations utilize the IOC Input Data Buffer 68 and IOC Write Back Buffer 70, while CPU transfers use the CPU input data Buffer 48 and the CPU Write Back Buffer 50.

Main Memory 18 is accessed over the 64 bit Memory Bus 72. It is addressed as a 30 bit device, which is implemented with Dynamic RAM parts, and includes registers and controls for such operations as initializing physical address ranges, checking and generating ECC codes, generating DRAM Refresh, and reporting errors. These memory features and others are only necessary to the invention as they enable the implementation of a reliable main memory subsystem.

Description of the Elements of a System with an I/O Cache: the CPU Cache Subsystem Operation Continuing to refer to FIG. 2a, within the present implementation, the Central Cache and memory subsystem are utilized for Consistency Controls in two possible roles. First, for Class 1 and 2 DVMA devices, the Central Cache and memory subsystem are accessed on I/O Cache "misses" to check for data consistency between the Central Cache 34 and 36 and the I/O Cache 62 and 64. Second, for Class 3 DVMA devices, the Central Cache and memory subsystem can be the source (or destination) of the DVMA data.

For this latter case, the I/O Cache Miss Address Register 58 (described below) issues a physical address. This address is checked against the contents of the Central Cache Tag Array 34. The low order bits of the address from the I/O Cache Miss Address Register 58 are used to address both the Central Cache Tag and Data arrays 34 and 36. In particular, bits A(15:04) address the Tag Array 34, and bits A(15:02) address a word in the Data Array 36. The high order bits A(31:16) of the I/O Cache Miss Address Register 58 address are compared with the contents of the address field of the Tag Array 34 with the Central Cache Tag Address Comparator 40. If the compare is a match and the tag entry is legitimate, as indicated by a "Valid" bit within the Tag Array entry, then the I/O Cache Miss Address Register 58 access has resulted in a Central Cache "hit". If the I/O Cache Miss Address Register 58 issued a read operation, the contents of the Central Cache Data Array 34 addressed by A(15:02) are sent to the DVMA Data bus 54. If the I/O Cache Miss Address Register 58 issued a write operation, data from the DVMA Data bus 54 is written into the Central Cache Data Array entry addressed by A(15:02), with bytes modified as indicated by a "size" field set by the I/O Cache Miss Address Register 58. The corresponding Tag entry's "Dirty" bit is set to indicate that the cache line has been modified.

Should the address issued by the I/O Cache Miss Address Register 58 not result in a Central Cache "hit" (i.e., result in a cache "miss"), and the DVMA page is marked cacheable for the Central Cache 34 and 36, a block of data from Main Memory 18 is read through the CPU Input Data Buffer 48 and placed into the Central Cache Data Array 36. On a DVMA read miss, the miss data from the memory interface is forwarded onto the DVMA Data bus 54. If the operation is a write, incoming data from Main Memory 18 is merged with modified bytes of DVMA data from the DVMA Data bus 54. This merged data is written into the Central Cache 34 and 36, along with the rest of the cache block from memory, and the "Dirty" bit in the Central Cache Tag Array 34 is set. For any miss, as long as the DVMA page is marked cacheable for the Central Cache 34 and 36, the address of the new data is written into the address field of the Central Cache Tags 34.

Should a cache miss require data from Main Memory 18 to be written to a location in the Central Cache Data Array 36 currently occupied by a valid cache block that had been previously modified, the block is first read out of the Central Cache Data Array 36 into the CPU Write Back Buffer 50. The data is written into Main Memory 18 from the CPU Write Back Buffer 50 after the memory read required by the cache miss. If the Central Cache hit rate is high, then the Main Memory 18 traffic generated by the CPU 12 will be low, allowing high bandwidth for DVMA devices to access Main Memory 18.

For DVMA Class 1 and Class 2 devices, the Central Cache 34 and 36 is used to provide data consistency between the Central Cache 34 and 36 and the I/O Cache 62 and 64. If the I/O Cache Miss Address Register 58 indicates a read DVMA bus cycle, then data is sourced from the Central Cache 34 and 36 onto the DVMA Data bus 54 if the DVMA address "hits" the Central Cache 34 and 36. If the DVMA read address "misses" the Central Cache 34 and 36 (the typical case) then read data is sourced from Main Memory 18 through DVMA subsystem data buffers 68 and 70, as explained below.

Similarly, if the I/O Cache Miss Address Register 58 indicates a write DVMA bus cycle, then a "hit" in the Central Cache 34 and 36 causes the Central Cache entry at the "hit" address to be invalidated. A "miss" in the Central Cache 34 and 36 simply allows the DVMA operation to complete within the I/O subsystem.

Description of the Elements of a System with an I/O Cache: the I/O Cache Subsystem Continuing to refer to FIG. 2a, within the I/O subsystem, the VMEbus Master and Slave Interface 16 includes drivers and receivers for the VMEbus address and data busses together with arbiter logic, interrupt handling logic, and such other controls as are needed to implement a VMEbus Master and Slave interface 16 according to the VMEbus specification. The VMEbus Slave interface 16 supports DVMA cycles from the system bus.

Figure 4A:
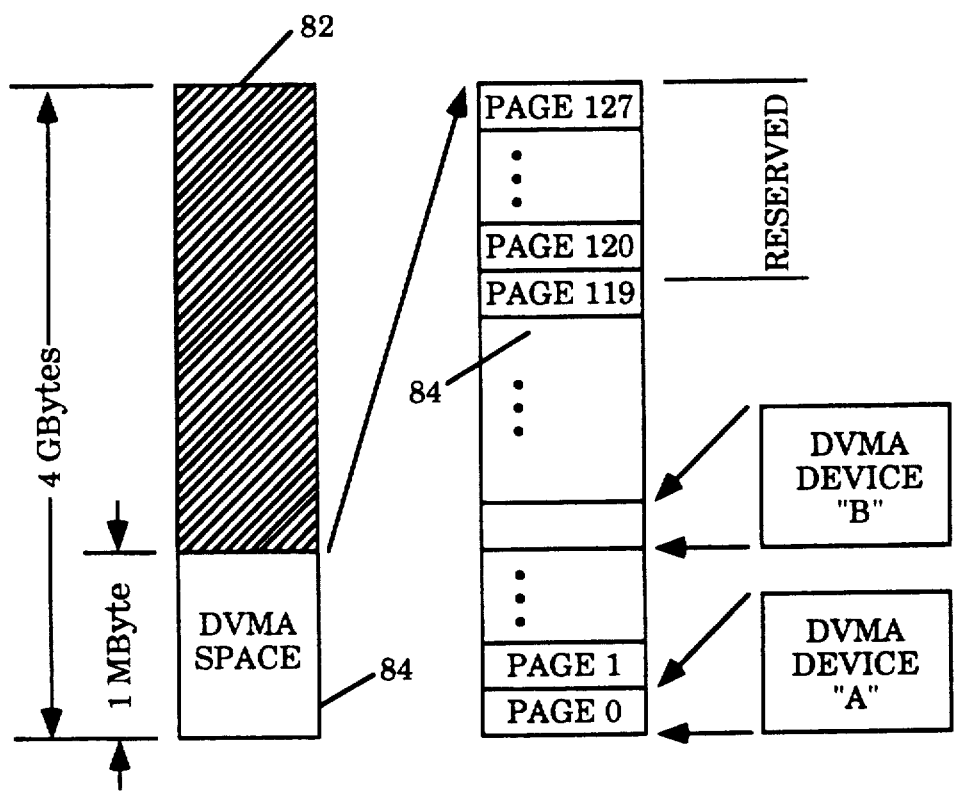
FIG. 4a is a diagram showing the DVMA address space for a typical computer system.

A particular element of this control is logic to recognize virtual VMEbus addresses within the CPU's VMEbus DVMA address space. (This DVMA virtual address space is shown in FIG. 4a). From the full 32 bit (4 gigabyte) VMEbus address space 82 (VMEbus A32 option from the VMEbus specification), or from the 24 bit (16 Megabyte) VMEbus address space (option A24 from the VMEbus specification), the lowest (P) pages are recognized as the DVMA virtual address space 84 for the system, where each page is of size (S) bytes. In the present implementation, the page size is (S=8) kilobytes, and the DVMA virtual address space 84 for VMEbus devices is (P=128) pages total. Of these, the top 8 pages are reserved.

The operating system's use of this address space is crucial to the invention concept. This use requires that at any time, each VMEbus DVMA Class 1 device maps to its own unique page or pages within the VMEbus DVMA virtual address space 84. This mapping may change dynamically over time, but can never change so that this use convention is violated. As a consequence of this use, each page in the VMEbus DVMA virtual address space 84 for Class 1 devices is dedicated to, at most, one DVMA device.

In general, implementations of an I/O cache may have multiple pages within a DVMA address space 84 map to a small set of I/O cache blocks, for DVMA Class 2 devices. Such a mapping will be possible provided that each DVMA device dynamically map to a unique set of I/O cache blocks. This mapping may give less overall performance compared to the one page per block mapping for Class 1 devices, but can still provide an overall system performance advantage over a non-I/O cache system. The implementation described here includes an example of a Class 2 DVMA device in its mapping of the Ethernet DVMA address space (below).

The Ethernet Network DVMA Interface 18 includes an Ethernet control chip and supporting logic together with address and data registers and buffers to interconnect with the DVMA Address and Data busses 52 and 54. The mapping of the Ethernet DVMA device into the I/O Cache differs from the mapping of the VMEbus DVMA devices into the I/O Cache. With Ethernet, the entire Ethernet DVMA address space 88 (FIG. 4b) of $2^{**}E$ bytes (where E is 24 bits in the present implementation) is mapped into two I/O cache blocks: one for Ethernet read data and a second for Ethernet write data. This mapping still follows the principle that mapping of all Class 1 devices is unique, and that the mapping of Class 1 and Class 2 DVMA address spaces into the I/O cache is unique. The two I/O cache blocks for Ethernet data in this implementation are placed at the top of the I/O cache's address space 86, claiming blocks left unused at the top of the VMEbus DVMA virtual address space 84.

Referring back to FIG. 2a, the DVMA Address Bus 52 is a virtual address address bus which interconnects the VMEbus DVMA address interface 16, the Ethernet DVMA address interface 14, and the CPU to DVMA Address Buffer 31 with the I/O Mapper 56, the block address inputs for the I/O Cache Tag and Data Arrays 62 and 64, the I/O Cache Address Comparators 66a and 66b, the I/O Cache Miss Address Register 58, the I/O Cache Address to Data Buffer, and the I/O Cache Control Logic 60a and 60b.

The DVMA Data Bus 54 interconnects the VMEbus data interface 16, the Ethernet data interface 14, and the CPU to DVMA Data Transceiver 33 with the I/O Cache Tag and Data Arrays 62 and 64, the I/O Cache Address to Data Buffer 57a and 57b, the I/O Cache Address Comparators 66a and 66b, the I/O Cache Input Data Buffer 68, the I/O Cache Write Back Buffer 70, and the I/O Cache Control Logic 60a and 60b.

The I/O Mapper 56 translates the virtual addresses from the DVMA devices into physical addresses while performing protection checking. The Mapper 56 is effectively a simple MMU. It has an entry for each page of the DVMA address space. Each entry is L bits in width and is broken into an address bit field and a status bit field. The address field provides the translation from virtual to physical page number for the virtual address supplied at the input. The status field consists of several bits which indicate, if the page is valid, what the write and access protections for the page are, and if the page is I/O Cacheable. The key status bit required is the I/O Cacheable bit. The particular content of the I/O Mapper 56 may vary considerably. In fact, an I/O system using DMA, with physically mapped devices, can still use the same principals described in this invention. An I/O Cacheable bit would, however, still be required for such a system.

The I/O Cacheable bit in the I/O Mapper 56 distinguishes those pages, and consequently those DVMA devices, which can use the I/O Cache 62 and 64 from those which can not. DVMA Class 1 and Class 2 devices are mapped as I/O Cacheable, while DVMA Class 3 devices are mapped as non-I/O Cacheable. DVMA transfers for these later devices are handled as accesses to the Central Cache 34 and 36, ignoring the I/O Cache 62 and 64.

The Miss Address Function Driver (74 in FIG. 2c) drives the low order address bits, IORA(03:00), with new updated page statistics and control bits during a page mapper update.

The I/O Miss Address Register 58 captures the physical DVMA address for bus cycles which are non-I/O Cacheable, as indicated in the I/O Mapper 56. The I/O Miss Address Register 58 also captures the physical DVMA address for DVMA cycles from Class 1 devices which "miss" the I/O Cache 62 and 64. The address source for low order bits within a page is the Virtual I/O Address Bus 52, while the I/O Mapper 56 sources the physical page translation.

The I/O Cache Control Logic 60a and 60b controls the arbitration of the CPU 12 and DVMA devices for use of the I/O Address and Data busses 52 and 54; the indexing of both the I/O Mapper 56 and the I/O Cache Tag and Data Arrays 62 and 64; the updates of the I/O Mapper 56 from the CPU 12; updates of the I/O Cache Tag and Data Arrays 62 and 64 from the CPU 12, from the I/O Mapper 56, and from Main Memory 18; the control of Flush commands from the CPU 12 to the I/O Cache 62 and 64; and all other controls associated with independent DVMA operation of the I/O Cache 62 and 64. This logic also interacts with the CPU Control Logic 46 on all I/O Cache misses, for cache consistency; all CPU 12 accesses to devices within the DVMA subsection; and on all DVMA accesses to non-I/O Cacheable pages, again for cache consistency. It finally provides such control related to the handling of DVMA cycles and CPU 12 access of DVMA logic which is necessary for both testability and functionality but is not explicitly enumerated in this summary description.

The I/O Cache Tag and Data Arrays 62 and 64 contain P cache tag entries and P cache data blocks. Each I/O Cache data block contains B bytes of data. Generally, the I/O Cache Data Array 64 block size is the same as the Central Cache Data Array 36 block size. This is not a requirement but does simplify the system implementation. Each of the P I/O Cache Tag Array entries records the memory address and control information for each of the P blocks of data in the I/O Cache Data Array 64 at the corresponding address. In general, the memory address in the I/O Cache Tag Array 62 may be either a physical address or a virtual address, and this virtual address again may be either from the DVMA device address space or from the operating system address space for DVMA Devices. In the present implementation, the address field of the I/O Cache Tag Array 62 contains a physical address.

Figure 4B:
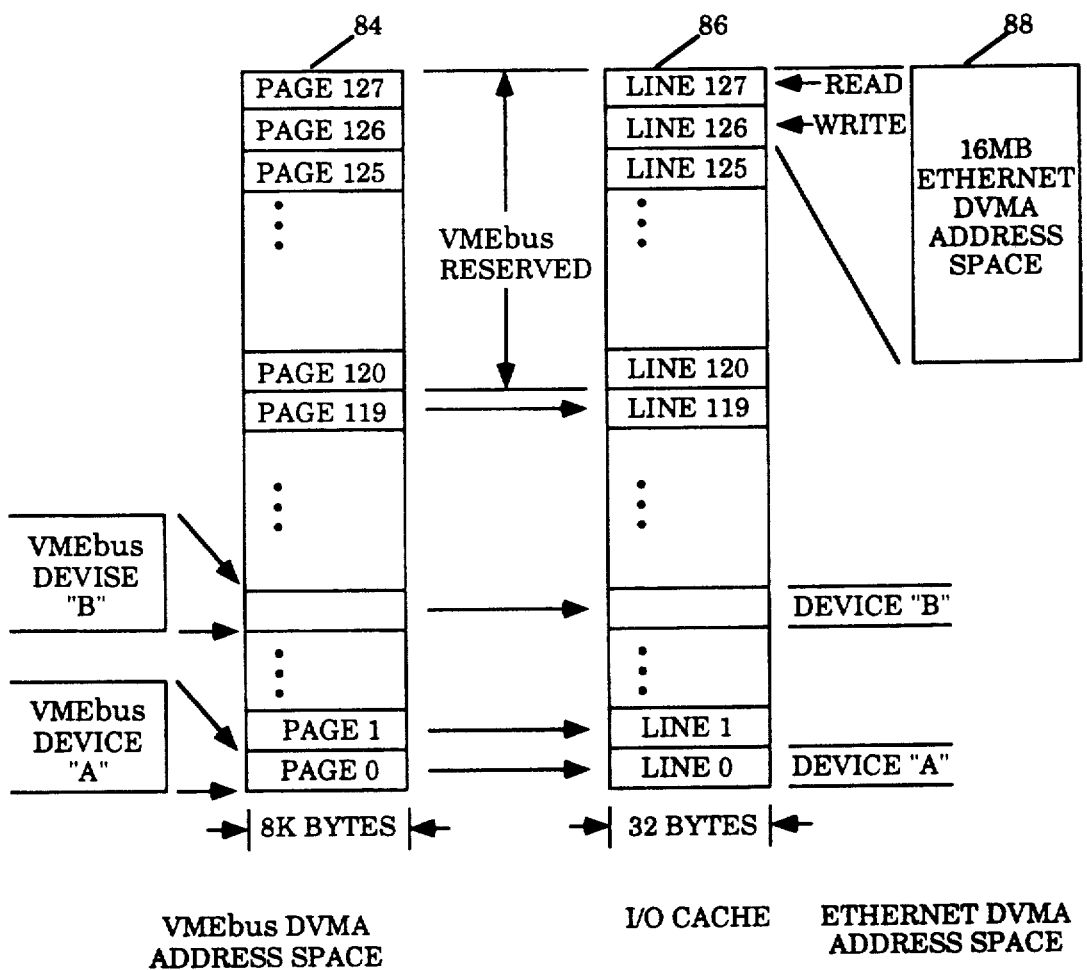
FIG. 4b is a diagram showing how the DVMA address space maps into the I/O cache for Class 1 and Class 2 devices.

The I/O Cache Tag and Data Arrays 62 and 64 must be addressed by a set of bits from either the DVMA virtual address space or the physical address space such that the chosen bit set guarantees that each Class 1 DVMA device be dynamically assigned one or more cache I/O cache blocks for DVMA transfers which are unique from those of any other device, and each Class 2 device similarly be assigned I/O cache blocks which are unique from both other Class 2 DVMA devices and all Class 1 DVMA devices. In the present implementation, the I/O Cache Tag and Data Arrays 62 and 64 are addressed with VIOA(19:13) for VMEbus DVMA devices, which corresponds to the page index within the virtual VMEbus DVMA address space. Within this range, as illustrated in FIGS. 4a and 4b, the top 8 pages are unused. Two of these are in turn assigned for use as Ethernet buffers: one for Ethernet read data, at A(19:13)=0×7 f, and one for Ethernet write data, at A(19:13)=0×77.

If the address bits chosen to index the I/O cache tag and data arrays, 62 and 64, do not uniquely identify the DVMA block address within a DVMA address space to which a device is transferring data, even though the bits uniquely distinguishes the device itself, the tag array 62 must contain within its address field as many bits as are required to uniquely identify the DVMA block address. Since the block address for VMEbus DVMA transfers in the present implementation is uniquely identified by A(19:04), and since the I/O cache tag and data arrays, 62 and 64, are indexed by A(19:13), then only the bits A(12:04) would be required in the tag array address field to uniquely identify the block address. In the present implementation, as illustrated in FIGS. 4a and 4b, the Ethernet DVMA address space is 24 bits, so that a block of Ethernet DVMA data is identified by the Ethernet DVMA address A(23:04). Then within the two I/O cache buffers assigned fr Ethernet data, at A(19:13)=0x7f and A(19:13)=0x77, the entire Ethernet DVMA block address, or A(23:04), must be saved to uniquely identify the Ethernet data.

In general, the Tag Array 62 must contain within its address field as many bits as are required to uniquely identify the DVMA block address. In the present implementation, the Tag Array 62 contains a physical address. This is not a requirement for the I/O Cache 62 and 64, but leads to design simplifications in the present implementation.

In the present implementation, the tag array 62 contains physical addresses. This is not a requirement for the I/O cache, but leads to design simplifications in the present implementation. The I/O Mapper 56 maps both the 24 bit Ethernet DVMA address space and the 20 bit VMEbus address space into the physical address space, which is 32 bits in this implementation. Therefore the address field in the I/O Cache Tag Array 62 in this implementation contains the physical address A(31:04). This entire physical block address is needed to identify Ethernet blocks, but only the address field A(12:04) would be needed for VMEbus address identification. For simplification of controls in the present implementation, the entire address range, A(31:04) is compared for both Ethernet DVMA transfer and for VMEbus device DVMA transfers.

In an I/O Cache Tag Array 62 access in the present implementation, the Tag Array 62 address field bits A(31:13) are compared with the physical address PIOA(31:13) from the I/O Mapper 56, while the bits A(12:04) from the address field, which identify the block within a page, are compared with the corresponding bits VIOA(12:04) in the VIOA bus. If the two comparisons described above match and the valid bit of the I/O Cache Tag Array entry is set, then an I/O Cache "hit" is indicated.

The I/O Cache Tag Array 62 may be accessed by the CPU 12 for at least two distinct operations, a diagnostic read/write operation and an I/O Cache flush command, depending on the cache consistency implementation. CPU diagnostic cycles can write data into and read data patterns from the Tag Array 62 as a P entry memory array. In the present implementation, the CPU 12 address bits A(10:04) index the Tag Array 62.

The I/O Cache Tag Array 62 is also updated as a part of normal DVMA cycles. If the DVMA device access "hits" the I/O Cache 62 and 64, then no update of the Tag Array 62 is required. If the DVMA device bus cycle is I/O Cacheable, has no protection violation (as indicated through the I/O Mapper 56) and "misses" the I/O Cache 62 and 64, then at the conclusion of the DVMA bus cycle, the entry in the Tag Array 62 will be written with the new DVMA physical block address, the valid bit set to true, and the modified bit set if the DVMA device is executing a write cycle. On DVMA write cycles which "miss" the I/O Cache 62 and 64, if the old Tag Array entry is marked valid and modified, then the physical block address from the Tag Array 62, A(31:04) in the present implementation, is written into the I/O Cache Miss Address Register 58. This address will be loaded into the CPU Memory Address Register 44 to provide the write back address for the modified I/O Cache block.

The I/O Cache Data Array 64 has P blocks, corresponding to the P Tag Array entries. Like the Tag Array 62, it may be accessed by the CPU 12 for at least two distinct operations, a diagnostic read/write operation and an I/O Cache Flush command, as part of the Consistency Controls. CPU diagnostic cycles can write data into and read data patterns from the Data Array 64 as a P entry memory array of B bytes. In the present implementation, the CPU 12 address bits A(10:04) index the block of the Data Array 64, while A(3:2) identify a word within the block.

The I/O Cache Address Comparators 66a and 66b provide the address comparison to determine if an I/O Cache "hit" has occurred. In the present implementation, the block identification bits from the Tag Array, A(12:04), must match the DVMA address in VIOA(12:04), and the physical page address from the Tag Array, A(31:13), must match the I/O Mapper 56 physical address, PIOA(31:13).

The I/O Cache Address to Data Buffer 57a and 57b provides the path to access the output of the I/O Mapper 56 onto the I/O Data Bus 54. This buffer has two uses. First, this path is used to update the physical address field in the I/O Cache Tag Array 62. Second, the path is used for diagnostic testing of the I/O Mapper 56 by the CPU 12.

The IOvalid, IOdirty, Write Back Function Update Logic (76 in FIG. 2b) drives the low order address bits, IORA(03:00), with new updated tag values on I/O Cache updates. It also examines these bits during an I/O cache tag check to see if a write back of a modified I/O Cache block is required.

The I/O Cache Input Data Buffer 68 provides the data path to the I/O Cache data Array 64 for DVMA data returned from Main Memory 18 on DVMA read cycles which "miss" the I/O Cache 62 and 64. On such operations, the "miss" data for the DVMA device is simultaneously bypassed to the DVMA device while it is written into the I/O Cache Data Array 64. The buffer is also used as the data path for returning data from Main Memory 18 to those Class 3 DVMA devices which are mapped to non-I/O Cacheable pages.

The I/O Cache Write Back Buffer 70 provides the data path for writing modified data from the I/O Cache Data Array 64 back into Main Memory 18. It also buffers the write back address from the I/O Cache Tag Array 62.

Description of the Elements of a System with Consistency Controls: the I/O Cache Subsystem Operation Summary Continuing to refer to FIG. 2a, the operation of the components of the I/O Cache subsystem for a DVMA transfer from a VMEbus device is summarized below. The cycle begins with the VMEbus DVMA interface 16 decoding the VMEbus address as being in the DVMA address space. Since VMEbus is the default device on the I/O address and data busses 52 and 54, the I/O Cache Tags 62 and I/O Cache Mapper 56 are accessed immediately, in parallel with the synchronizing of the VMEbus Address Strobe. The VMEbus address within the DVMA address space, VMEA(19:01), maps directly into the I/O address bus VIOA(19:01); VIOA(00) is set from VMEbus byte controls.

The VMEbus device uses the virtual DVMA page address VIOA(19:13) to index the I/O Cache Tag Array 62. The address field of the I/O Cache Tag Array 62 contains a physical address. The I/O Cache Address Comparator 66a and 66b compares the lower order block address bits contained in the address field of the tag entry selected, A(12:04), against the untranslated bits of the DVMA block address generated by the VMEbus device, in VIOA(12:04).

For Ethernet accesses, however, this is not the case. The Ethernet DVMA address space is 24 bits, A(23:00). I/O cache controls set the I/O cache tag and data index to either the Ethernet read block, at address A(19:13)=0x7f, or to the Ethernet write block, at A(19:13)=0x77. The physical address field A(31:13) from the I/O cache tag array must be matched with the translated page address, RIOA(31:13), from the I/O Mapper 56. In general, this comparison of the complete physical address is made for both Ethernet and VMEbus accesses, but is required only for Ethernet accesses. Furthermore, saving both the Ethernet and VMEbus physical addresses in the I/O cache tag array avoids the necessity of retranslating the VMEbus DVMA addresses at the time that a modified block is written back to main memory.

Figure 3B:
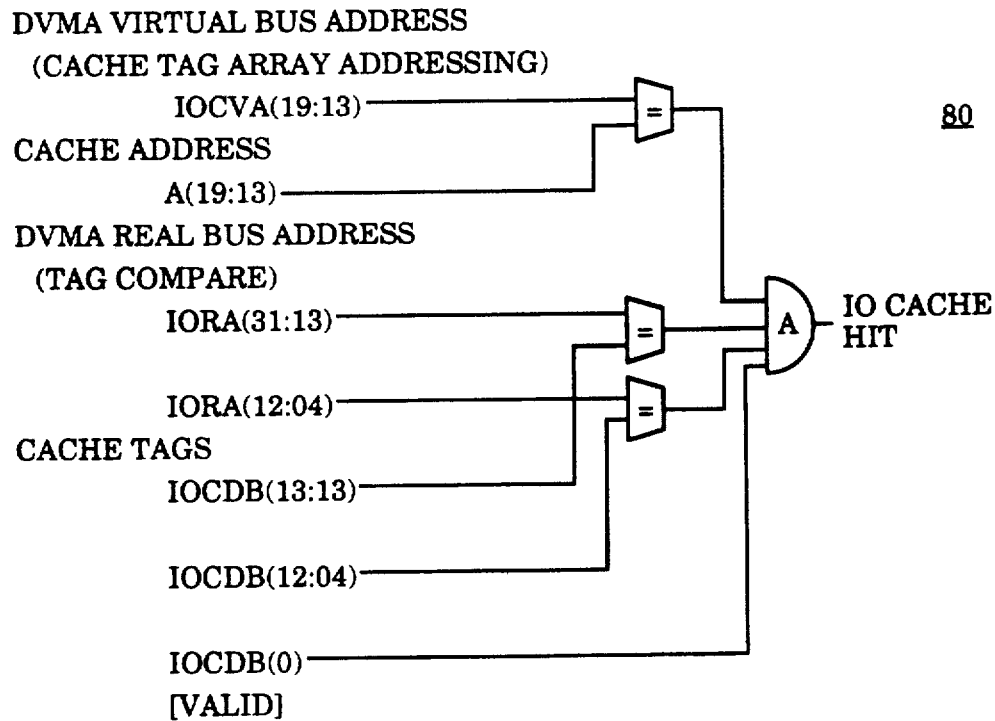
FIG. 3b is a diagram showing the cache "hit" logic for the I/O cache.

In parallel with the I/O Cache Tag Array 62 access, the I/O Mapper 56 is also accessed. The Mapper 56 output, RIOA(31:13) is then compared with the Tag Array 62 high order address field, TAGA(31:13) for the second tag address comparison. If the two comparisons described above match and the valid bit of the I/O Cache Tag Array entry is set, then an I/O Cache "hit" is indicated. (The I/O Cache hit logic shown in FIG. 3b.)

During DVMA cycles which "hit" the I/O cache, 62 and 64, data from the I/O cache data array 64 is rad from or written to the array. In the present implementation, the address VIOA(19:13) selects a block and VIOA(3:2) selects a word within the block. On a DVMA read cycle, data is read from the array 64 and returned to the device. On a DVMA write cycle, data from the device is written into the array 64, using I/O cache word and byte select logic to select the cache data to be updated. An I/O Cache "miss" results, in general, if either of the two address comparisons does not match, if the valid bit in the Tag Array 62 is not set, or if the Dirty bit is not set on a bus cycle in which the DVMA device is doing a write cycle.

On a Class 1 or Class 2 DVMA read "miss" cycle, the DVMA device issues a read operation to a particular DVMA address which is not contained in the I/O cache tag array 62. The I/O Cache Control Logic 60a initiates a read operation to the main memory 18 and/or the central cache 34 and 36, depending on the implementation of cache consistency, to get a block of data from the address requested by the DVMA device. The subset of the block of data containing the byte or bytes requested is bypassed to the DVMA device while the entire block is written into the I/O cache data array 64. Subsequent sequential reads by the DVMA device will result in an I/O Cache "hit" until all the data of the block addressed in the initial "miss" cycle has been read by the DVMA device. It is only the initial "miss" cycle that requires arbitration with the CPU 12 and access to the Central Cache 34 and 36, if a consistency check is made against this cache.

During a Class 1 or Class 2 DVMA write cycle which "misses" the I/O Cache 62 and 64, in the present implementation the I/O Cache Tag Array entry addressed by the DVMA device is first examined. If this block is valid and modified, then the address from the Tag Array 62 and the block of data from the data array are downloaded into the I/O cache write back buffer 70; if the block is not modified, no download is necessary. The DVMA data from the current write cycle can now be written into the I/O Cache Data Array 64, and the I/O Cache Tag Array entry can be updated with the new physical address and marked valid and modified. A DVMA write back cycle, with the address and data provided through the I/O Cache Write Back Buffer 70, returns the former modified data from the I/O Cache 62 and 64 to Main Memory 18. The completion of the DVMA write cycle does not depend on completing the Write Back cycle to Main Memory 18. Depending on the implementation, the I/O cache "miss" may cause a consistency check to be made against the central cache.

Subsequent sequential writes by the DVMA device will result in an I/O Cache "hit" until the I/O cache block is filled. Then the next sequential write will result in an I/O Cache "miss". Assuming that the address accesses the same I/O Cache entry, the data in the I/O Cache block is dirty and cannot be overwritten by new data. This "miss" causes an I/O Cache Write Back cycle to be initiated by filling the Write Back Buffer 70 before new data is written into the I/O Cache 62 and 64.

On both read and write cycles which miss the cache and have no protection violation, the I/O Cache Control Logic 60a and 60b updates the I/O Cache Tag Array entry addressed by the DVMA device. The real address field bits A(3 1:13) are updated with the translated physical address, from RIOA(31:13), transmitted onto the I/O Cache Data Bus 54 through the I/O Cache Address to Data Buffer 57. The block address bits A(12:04) are updated from VIOA(12:04), similarly transmitted onto the I/O Cache Data Bus 54 through the I/O Cache Address to Data Buffer 57.

Any data that might potentially remain in the I/O Cache Data Array 64 at the end of a transfer sequence by a DVMA device must be removed. This removal may be accomplished in a variety of ways, including the use of a Flush command from the CPU. The removal method is not specified within this claim.

Software and DVMA Device Assumptions for I/O Cache Usage

Continuing to refer to FIG. 2a, following is a summary of system software and DVMA device assumptions for the I/O cache of the present invention.

First, each DVMA (or DVMA) device within the system must conform to the requirements of Class 1 or Class 2 DVMA devices as specified above, to be I/O cacheable. This requirement prevents data corruption within the I/O cache due to multiple DVMA devices writing data into the same block of the I/O cache 62 and 64.

Second, when a DVMA device transmits data from its interface, 14 or 16, into main memory 18, then the DVMA device must completely fill the I/O cache block with data prior to causing an access to occur which will result in an I/O cache "miss" to that same cache block. This invention requires no "byte markers" to be maintained by the hardware to indicate which bytes within a cache block are modified. As a consequence of this, the DVMA device must satisfy this full block write requirement. This requirement also eliminates the need for the I/O cache controls to perform a read-before-write operation for each cache block, which would reduce the performance of the computer system. In summary, the I/O cache organization is that of a write back (copy back) cache with data fetch on read miss but no data fetch on write miss.

Third, the system software may, optionally, support diagnostic commands to test the I/O cache 62 and 64. These commands may include instructions to a restricted address range which can be used to write and read both the I/O cache tag array and data array 62 and 64. The diagnostic commands may also include instructions to a restricted range to functionally exercise the I/O cache 62 and 64 by a "loop back" mechanism, as described in the U.S. patent application "Loopback Testing of a Standard System Bus", Ser. No. 07/508,779, filed Apr. 12, 1990, now U.S. Pat. No. 5,161,162. Briefly, this test method requires the CPU to issue instructions to the VMEbus master interface 16. At the master interface 16, the VMEbus Slave interface 16 decodes the VMEbus address as DVMA accesses to main memory 18. The VMEbus arbiter gives priority to the DVMA operation which completes its access to either the I/O cache 62 and 64 or main memory 18, and then returns the data to the VMEbus interface 16. There the CPU controls take over and complete the VMEbus master cycle with the data read (or written) through the DVMA operation.

Fourth, the operating system may assist to ensure data consistency between the DVMA data coming through the I/O cache 62 and 64 and the central cache 34, Depending on the implementation of cache consistency, on DVMA read cycles, the DVMA data may be sourced from the central cache 34 and 36 is found there. Again, depending on cache consistency, on DVMA write cycles, a stale block of data found in the central cache 34 and 36 at the same physical address as a block of data being written by a DVMA device may be invalidated.

Fifth, at the conclusion of a DVMA transfer sequence, the implementation must specify a mechanism to ensure that all data from the I/O cache 62 and 64 is properly flushed from the I/O cache 62 and 64 into main memory 18 (on a DVMA write) or that the DVMA address is invalidated from the I/O cache 62 and 64 (on a DVMA read). This mechanism may be under the control of either hardware alone or combined hardware and software, but is not specified within this claim.

Sixth, the operating system must ensure that no CPU reference to DVMA data be made prior to the conclusion of the unspecified mechanism, above, which forces all data from the I/O cache 62 and 64 to be properly flushed from the I/O cache 62 and 64 into main memory 18 (on a DVMA write), or forces the DVMA address to be invalidated from the I/O cache 62 and 64 (on a DVMA read), at the conclusion of a DVMA transfer sequence.

The seventh requirement relates to which VMEbus DVMA devices may utilize the I/O cache 62 and 64. If a VMEbus DVMA device cannot be guaranteed to meet the six assumptions listed above, then this device is a Class 3 DVMA device, and the operating system software must mark the pages used by this device as non-I/O cacheable through the use of the I/O cache enable bit for the page in the I/O mapper 56.

I/O Cache Flowchart Operation

Figure 5:
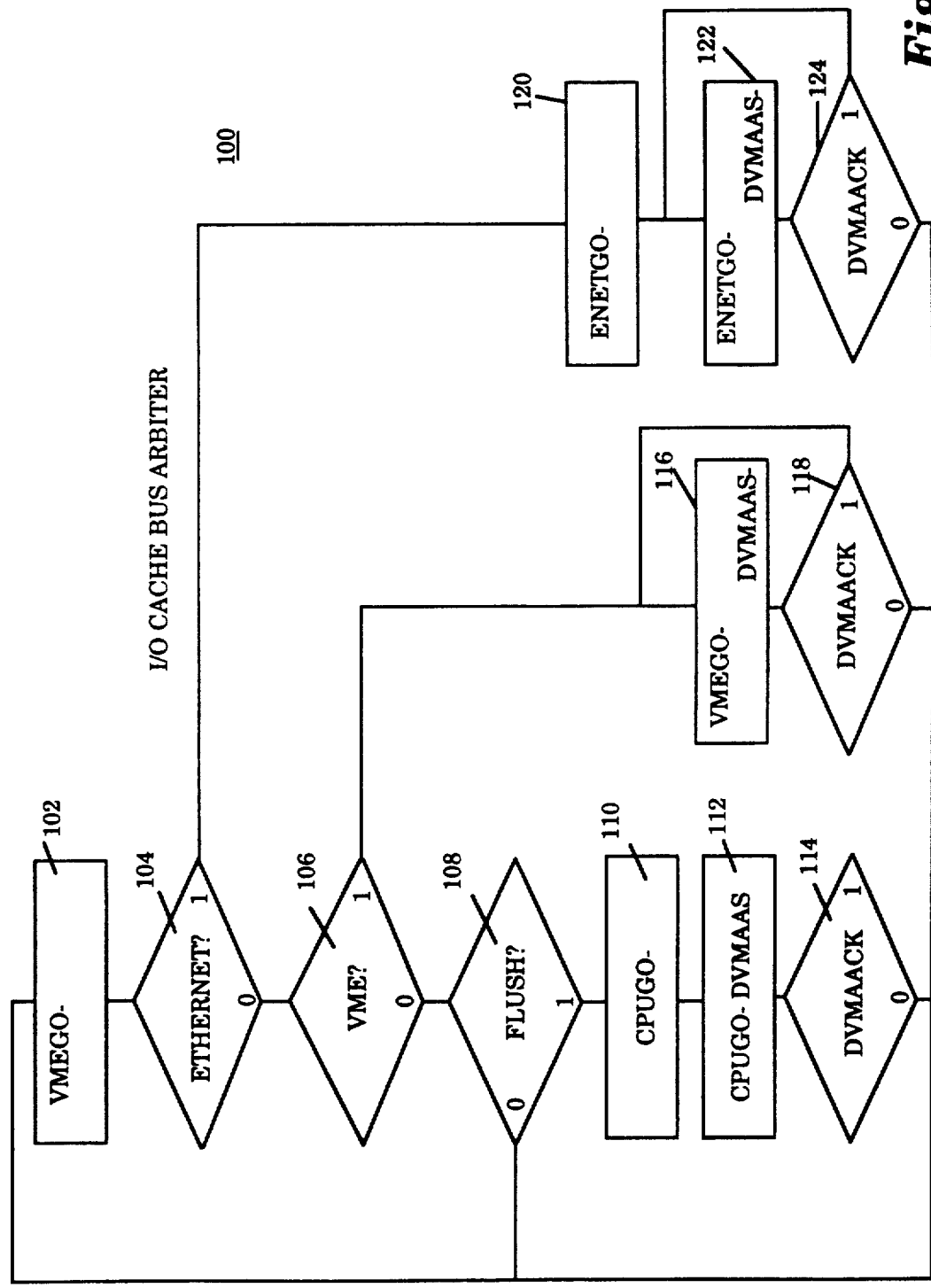
FIG. 5 is a flow diagram of a cache bus arbiter for the I/O cache which describes the arbitration of the I/O buses in response to three request types: an Ethernet request, a VME request, and a Flush I/O Cache request from the CPU.

Referring now to FIG. 5 which describes the arbitration of I/O Cache busses for fundamental I/O Cache bus cycles. There are three functional I/O Cache request types: a VMEbus request, an Ethernet request, and a CPU Flush request. In addition, the CPU can also issue at least three other requests which may require the use of I/O Cache busses, which are not fundamental to the functional operation of the I/O Cache. All of these requests behave, in terms of the arbiter operation, like the CPU Flush request which is shown.

The first additional CPU request is a VMEbus Master cycle, in which the CPU requires the use of I/O Cache data and address paths to access the VMEbus Master interface. The second CPU request is an I/O Cache Diagnostic cycle, in which the CPU tests the I/O Cache by writing and reading the I/O Cache tag and data arrays. This testing is not normally done as a part of the I/O Cache functional operation, but rather for diagnosis only. The third CPU request is an I/O Mapper update, in which the CPU reads and writes the contents of the I/O Mapper.

The following convention is used in the flowcharts to describe and reference certain control signals. If the signal is an "active high" signal, then its name has no "−" suffix; if it is an "active low" signal, then its name has a "−" suffix. If an active low signal is true, then it will be at a physical value of "0". When active low signals are tested in a decision block, a "0" decision block output corresponds to the condition that the active low signal is TRUE, and a "1" decision block output corresponds to the condition that the active low signal is false.

An Ethernet DVMA request from the Ethernet DVMA interface is indicated by the ETHERNET signal. A VMEbus DVMA request is indicated by the VME signal. This signal would result from an active VMEbus address and data strobe, together with a VMEbus address which is decoded as being within the DVMA address space recognized by the system. A CPU bus cycle which is decoded as an I/O Cache flush request is indicated by the FLUSH signal.

When the arbiter grants bus ownership to each of these three functional I/O Cache requests, the arbiter asserts a "GO" signal, which helps to control both the flow of control logic and also the enabling of various device data paths. The CPUGO- signal, blocks 110 and 112, is asserted for the Flush operation; the VMEGO- signal, blocks 102 and 116, for the VMEbus DVMA cycle; and the ENETGO- signal, blocks 120 and 122, for the Ethernet DVMA cycle. The arbiter also asserts a DVMA address strobe, labeled DVMAAS-, blocks 112, 116 and 122, to indicate a valid DVMA cycle to I/O cache state machines. Both the "GO" and DVMAAS- signals are deasserted at the conclusion of a bus cycle by a DVMA acknowledge signal, labeled DVMAACK-, blocks 114, 118 and 124, whose assertion is described in further detail later in FIG. 9.

Figure 6:
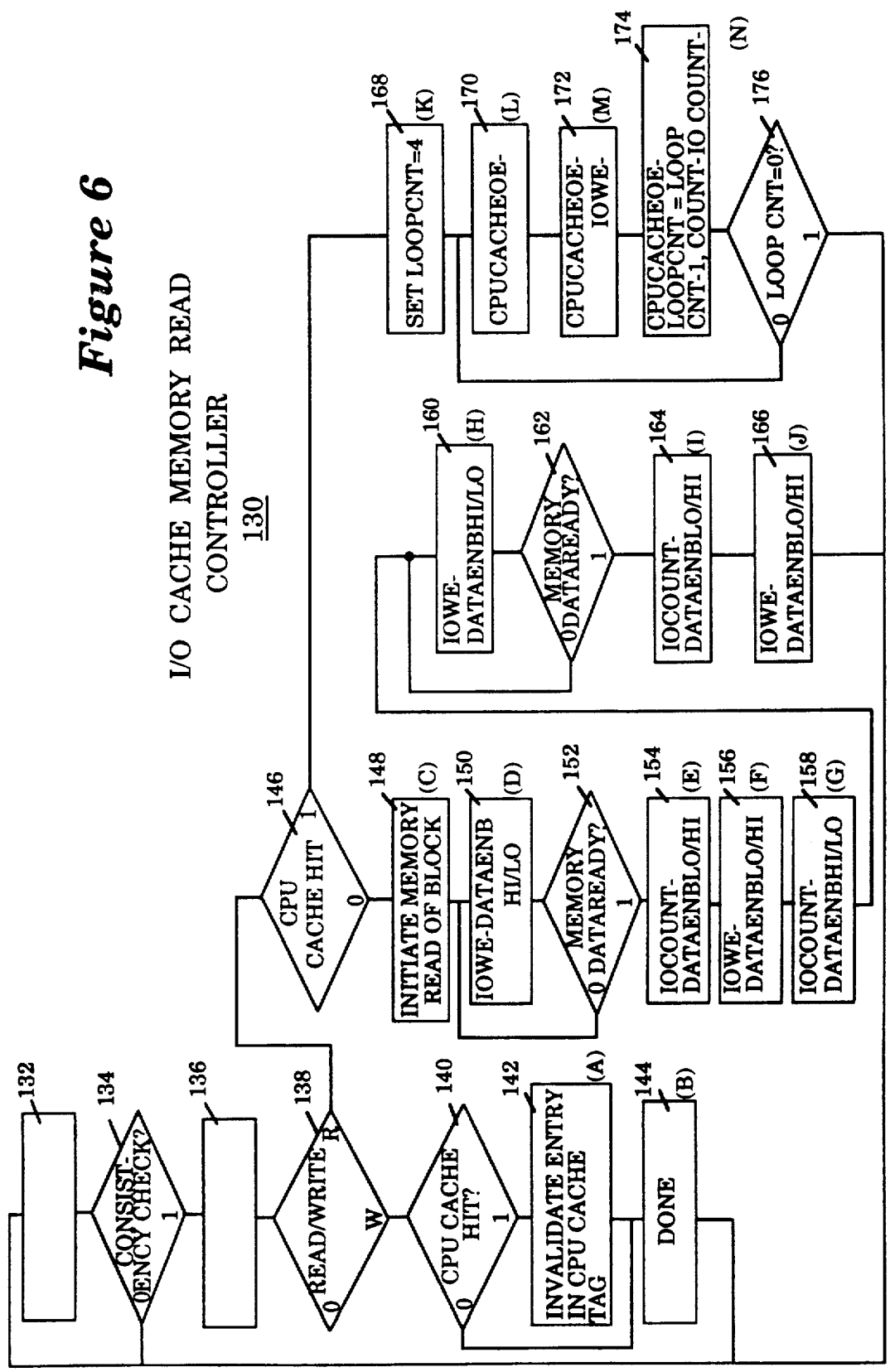
FIG. 6 is a flow diagram of a cache memory read controller for the I/O cache which describes the control of the memory read operation for I/O cacheable pages. Also shown in this diagram is how the data flow would be altered if hardware data consistency controls have been implemented.

Referring now to FIG. 6 which describes the memory read operation for an I/O cacheable DVMA cycle. The test condition CONSISTENCYCHECK, block 134, is both a control timing point and a logic signal. With the consistency checking in the preferred embodiment, this signal will be asserted, following an I/O cache miss detection and establishing that the DVMA page is I/O cacheable, when the DVMA consistency request gains CPU bus mastership and has the DVMA address asserted on the CPU address bus.

The control for systems with hardware Central cache data consistency checking is as follows. First, the test for READIWRITE, block 138, depends on whether the DVMA cycle is a read or write bus cycle. For both cases, a test is made to see if the DVMA address matches a tag address in the Central Cache, as indicated by the signal CPUCACHEHIT, blocks 140 and 146. For a write cycle which misses the Central cache, there is no action taken (state B). If a write cycle hits the Central Cache, then the Central Cache tags are invalidated (state A), block 142.

For a read cycle which misses the Central cache, a read request to main memory is initiated (state C), block 148. The I/O Cache Data Array will be continuously written (state D), block 150 until the first transfer of valid data is returned from main memory, as indicated by the control signal MEMORYDATAREADY, block 152. This signal is set in response to a Data Ack 0 and a Data Ack 1 signal from main memory. The DATA- ENBHI and DATAENBLO control signals, blocks 150, 154-160, 164-166, enable, respectively, the high and low words of the IO Input Buffer. The IOWE- control signal, blocks 156, 166, sets the I/O Cache array write enable input. Since the memory bus is two 32 bit words in width, and the I/O cache array is one word, two update cycles are required for each memory bus transfer. These are shown as the states D, F, H, and J, blocks 150, 156, 160 and 166. In states E, G, and I, blocks 154, 158 and 164, the I/O Cache Data Array counter is incremented by one word, as indicated with the control signal IOCOUNT-, blocks 154, 158 and 164.

For a read cycle which hits the Central Cache, a line of data is read from the Central Cache and passed to the I/O Cache for updating. This is shown in the loop control states K, L, M, and N, blocks 168-174. The Central cache array output enable is indicated by the signal CPUCACHEOE-, blocks 170-174.

The control for systems with no hardware Central cache data consistency checking would be as follows. Basically, the control follows the path corresponding to the "0" branch from each CPUCACHEHIT test. For write DVMA cycles, no action is taken. For read DVMA cycles, the I/O Cache Data Array is updated by data from main memory, as shown in states C through J.

Figure 7:
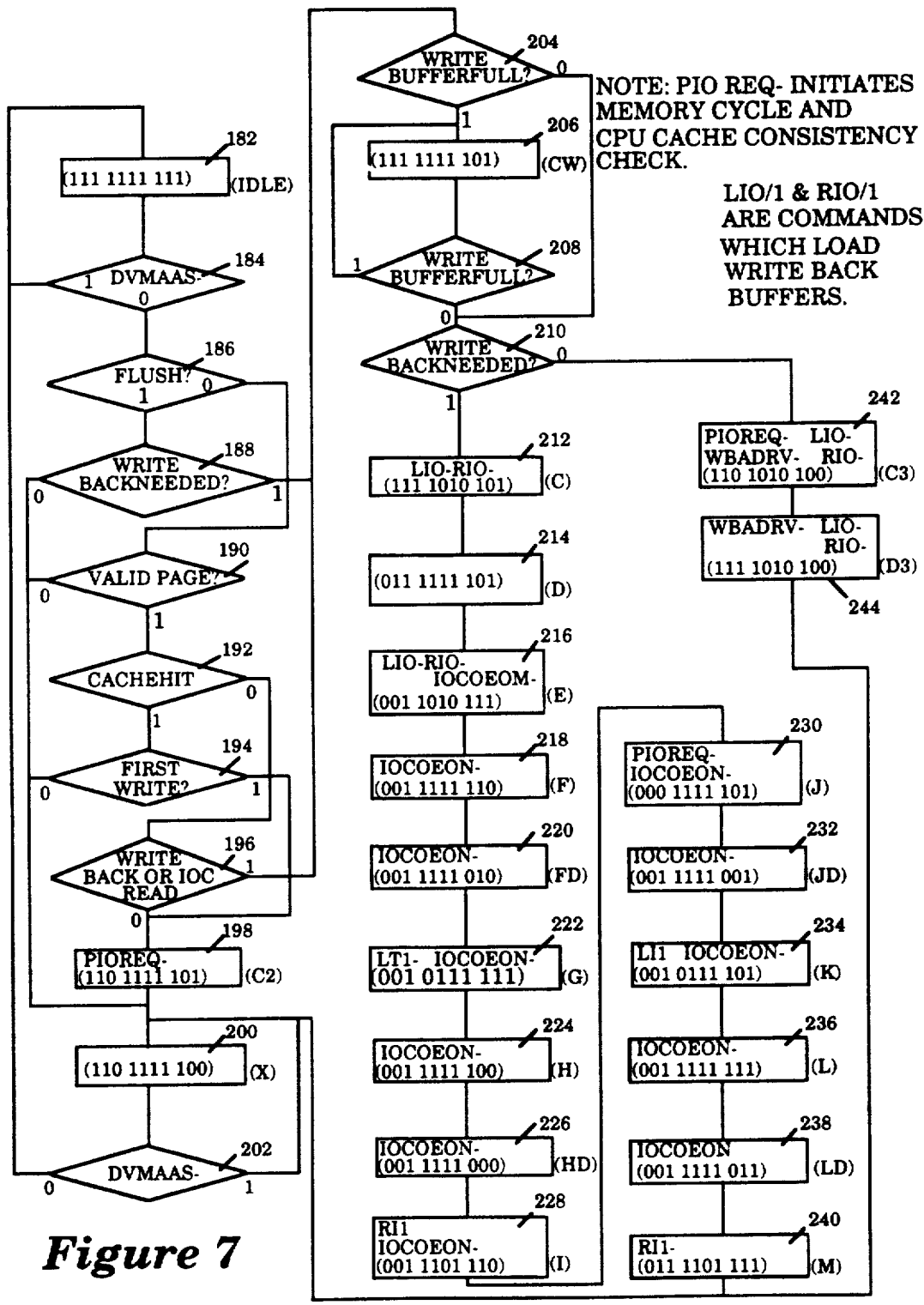
FIG. 7 is a flow diagram of a write back controller for the I/O cache which describes the control to download data into I/O Cache Write Back buffers when required.

Referring now to FIG. 7 which describes the I/O Cache write back control. To initiate this state machine, first DVMAAS-, blocks 184 and 202, must be asserted. A test is first made to see whether this cycle is a FLUSH, block 186, from the CPU. If so, a test is made for WRITEBACKNEEDED, block 188. This control signal will be set if the I/O Cache Tag Array indicates that the addressed block is both valid and modified (or "dirty"). If so, a test is made for WRITEBUFFER- FULL, block 204. This control signal will be set if the I/O Cache Write Back Buffer still has valid contents from a previous I/O Cache cycle requiring data to be written back to main memory. If the buffer is full, the state machine loops in state CW until the Write Back buffer is available.

Now the current I/O cache block can be downloaded into the Write Back buffer. First, in state C, block 212, the address for the block is loaded into the IO Write Back Buffer from the data transceivers between the IORA bus and the IOCDB bus. The data had been captured in the transceivers at the start of the cycle. (See also the description for FIG. 10, below.) The Write Back Buffer buffers both the write back address as well as the block of data. The control signal IOCOEON-, blocks 216-238, indicates to the state machine in FIG. 8 that the I/O cache output enable is to be set active to read data onto the IOCDB data bus; the actual enable signal, IOCOE-, is set in FIG. 8. The control signals L10-, R10-, L11-, and R11-, blocks 212, 216, 228, 234, 240-244, control the selection of the word buffers within the I/O Cache Write Back buffer for both the data and the address. In state J, block 230, a signal PI- OREQ-, block 240, is asserted to indicate to the system memory controller that a write back cycle to main memory must be initiated. When all data is loaded, in state M, block 240, the state machine control goes to state X, block 200, where it waits until the controls complete this I/O Cache bus cycle.

If a FLUSH request has no WRITEBACKNEED- ED- active, blocks 186 and 188 then the state machine branches to state X, block 200, directly. If there is no FLUSH request, a test is made for VALIDPAGE, block 190. The control signal is set if the DVMA page in the I/O Mapper is marked as valid; this signal is output by the I/O Mapper. If the page is invalid, control is transferred to state X, block 200. If the page is valid, then a test is made for an I/O Cache hit, block 192, indicated by the control signal CACHEHIT. This signal is set by the hit logic for the I/O cache.

If there is an I/O cache hit, then a test is made for FIRSTWRITE, block 194. This control signal is set if the DVMA cycle is a write cycle but the I/O Cache Tag Array entry is marked as not modified (not "dirty"). If this cycle is a first write cycle, then the Central cache must be checked for cache consistency, as required for support of the present invention. The request for a cache consistency check is made through the PIOREQ- control signal, block 198. If this DVMA cycle is not a first write cycle, then control branches to state X, block 22 to wait for the completion of the cycle.

If the DVMA cycle misses the I/O cache, as indicated by a deasserted CACHEHIT, block 192, then a test is made for the signal WRITEBACKORIO- CREAD, block 196. This signal is set if either the current I/O Cache Tag Array entry is valid and modified (indicating write back is required) or if the DVMA bus cycle is a read cycle to the I/O Cache. This is established by checking the I/O Mapper to see if the DVMA cycle is I/O cacheable. If WRITEBACKORIO-CREAD, block 196, is not active, then the state machine transitions to state C2, block 198 where PIOREQ- will be asserted on a read bus cycle to initiate the memory read cycle as well as a Central Cache consistency check, if supported.

If WRITEBACKORIOCREAD is active, then the state machine again tests for a WRITEBUFFERFULL condition, block 204. On a DVMA read cycle, this test ensures data consistency among DVMA bus cycles by guaranteeing that a FIFO ordering is observed in processing DVMA requests: the previous write back cycle must complete before the read miss cycle to main memory is initiated. When the WRITEBUFFERFUL condition is cleared, block 208, then a further test of WRITEBACKNEEDED, block 210, differentiates DVMA read miss cycles from cycles requiring a write back. If WRITEBACKNEEDED is inactive, then the DVMA address is loaded into the IOC Miss Address Register by enabling the address through the signal WBADRV-, blocks 242-244. The signal PIOREQ-, block 242, is asserted to initiate a block read memory bus cycle and a Central Cache consistency test.

On a DVMA write cycle which misses the I/O Cache, the control signal WRITEBACKORIO-CREAD, block 196, will be deasserted. Control will fall through to state C2, block 198, which will initiate a consistency test for the read miss address in the Central Cache through PIOREQ-, if hardware consistency is implemented.

Figure 8A:
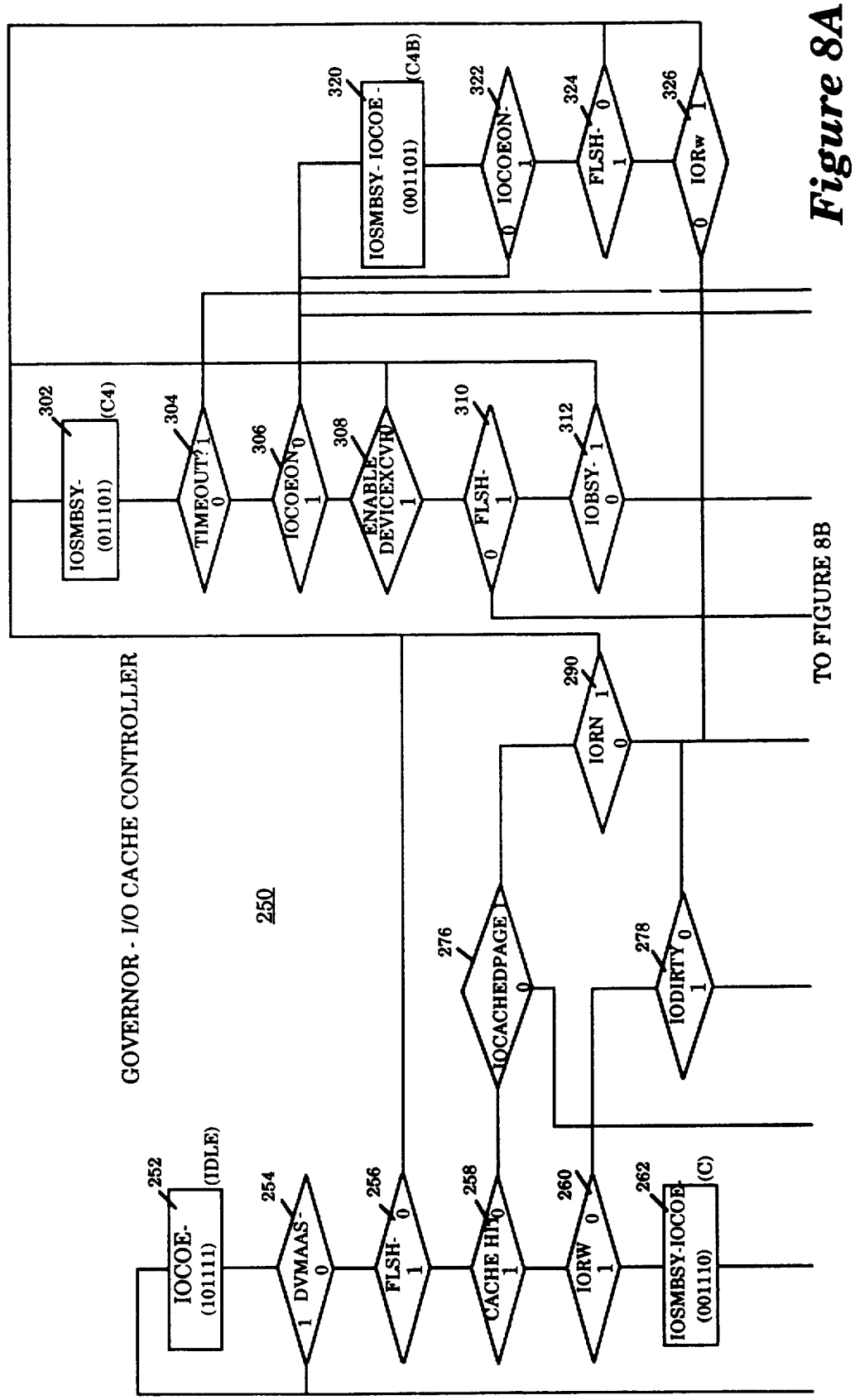
FIGS. 8a-8b are two flow diagrams of a governor for the I/O cache which describes the control of the I/O Cache data busses and certain I/O Cache state machines control signals.
Figure 8B:
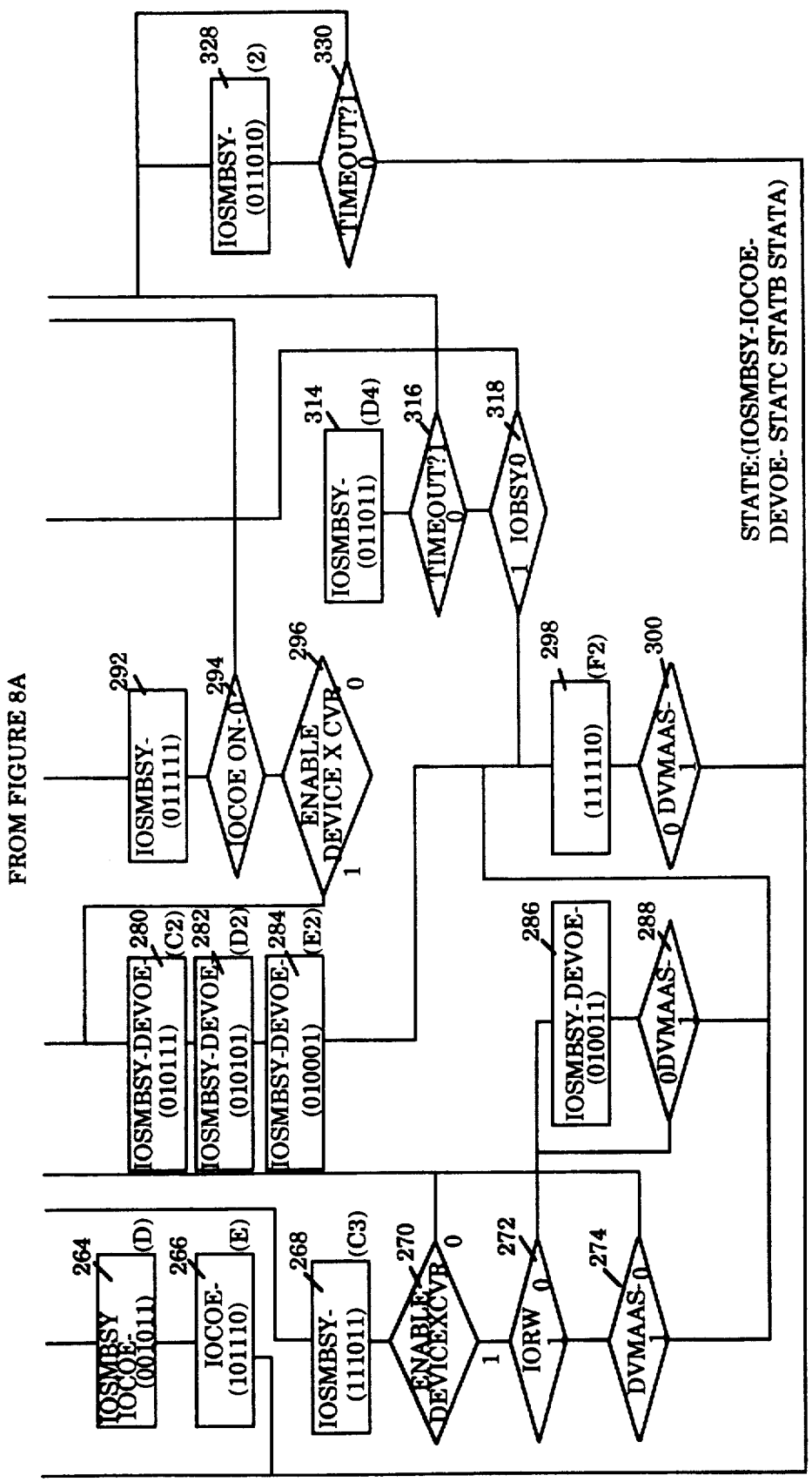

Referring now to FIGS. 8a and 8b, the basic controls for the state machines and the data bus are established. In the state IDLE, block 252, the I/O array output enable, IOCOE-, block 252, is set active. Since the default address for the I/O array is the tag array, and the default device priority is the VMEbus (FIG. 5), the I/O Tag Array entry addressed by the VMEbus is the default bus content for the IOCDB bus.

If FLSH-, block 256, is active, the state machine transitions to state C4, block 302. The TIMEOUT signal, block 304, tests for a memory bus time out. If it occurs, state Z, block 328, holds until the timeout signal, block 304, is deasserted. If TIMEOUT, block 304, is inactive, then IOCOEON-, block 306, is tested. This signal is set in FIG. 7. If active, it indicates that data must be downloaded into the I/O Cache Write Back buffer. State C4B, block 320, sets the output enable signal IOCOE-, block 320, to the I/O Cache array and holds this active until the download is complete. When the download is complete, the signal ENA-BLEDEVICEXCVR, block 308, tests whether the data bus transceivers for the device selected by the arbiter (FIG. 5) are active. These transceivers will be activated when the I/O Cache tag check is complete (if required) and the downloading of write back data is complete (if required). When ENABLEDEVICEXCVR, block 308, is active for the Flush cycle, block 310, the control passes immediately from state C4 to state F2, block 298, where the state machine waits for the conclusion of the cycle.

If FLSH-, block 256, is not active, the control signal CACHEHIT, block 258, is tested to see if an I/O Cache hit condition is detected. If not, then IOCACHEDP-AGE, block 276, is tested. This signal from the I/O Mapper determines whether the DVMA page is I/O cacheable. If the page is cacheable, the signal IORW, block 290, is tested. IORW is active on DVMA read cycles and inactive on DVMA write cycles. For DVMA read cycles to cacheable pages which miss the I/O cache, control passes to state C4, block 302. When TIMEOUT, block 304, and IOCOEON-, block 306, are inactive, ENABLEDEVICEXCVR, block 308, is tested. When the DVMA device (Ethernet or VMEbus) is enabled, the control signal IOBSY-, block 312, is tested. This signal is set by the main memory control logic and indicates that an I/O Cache bus cycle to main memory is active. It is reset at the conclusion of the memory bus cycle. The signal is tested twice, blocks 312 and 318, first, before the state D4, block 314, and second, after state D4, block 314. The first test is to establish whether the I/O Cache bus cycle to main memory is active yet; when it is, state control passes to state C4, block 302. The second test establishes whether the memory bus cycle is complete; if so, control passes to state F2, block 298, waiting the conclusion of the I/O Cache cycle.

I/O cacheable write DVMA requests which miss the I/O cache pass to state C2B, block 292. From here, the control signal IOCOEON-, block 294, set in FIG. 7, determines whether there is valid and modified data in the I/O cache entry which must be downloaded. If so, control passes to state C4B, block 320, until the download is complete. When complete, the signal ENA-BLEDEVICEXCVR, block 308, is tested to see if the DVMA device can drive the IOCDB bus. If so, the control signal DEVOE-, blocks 280-284, is set active in states C2, D2, and E2, blocks 280-284. This signal is gated with the device (VMEGO- and ENETGO-) to enable data onto the IOCDB bus. (The I/O cache write enable is controlled in FIG. 9.)

For DVMA read cycles which hit the I/O cache, control passes to state C, block 262. In states C, D, and E, blocks 262-266, the signal IOCOE-, blocks 262-266, is asserted, which enables the I/O Cache Data Array onto the IOCDB. For DVMA write cycles, a test is made for the IODIRTY signal, block 278, to determine whether the current I/O cache entry is marked as valid and modified. If it is not marked as modified, then control passes to state C2B, block 272, where the operation is treated as an I/O cache write miss. If IODIRTY, block 278, is active, then states C2, D2, and E2, blocks 280-284, drive DEVOE-, blocks 280-284, to enable the DVMA device data onto the IOCDB bus.

For DVMA requests for which IOCACHEDPAGE, block 276, is not active, control passes from IDLE, block 252, to state C3, block 268. Read cycles remain in state C3, block 268, until the cycle completes. Write cycles remain in state D3, block 286, with DEVOE-, block 286, active and the DVMA device driving the IOCDB bus, until the cycle completes.

Figure 9:
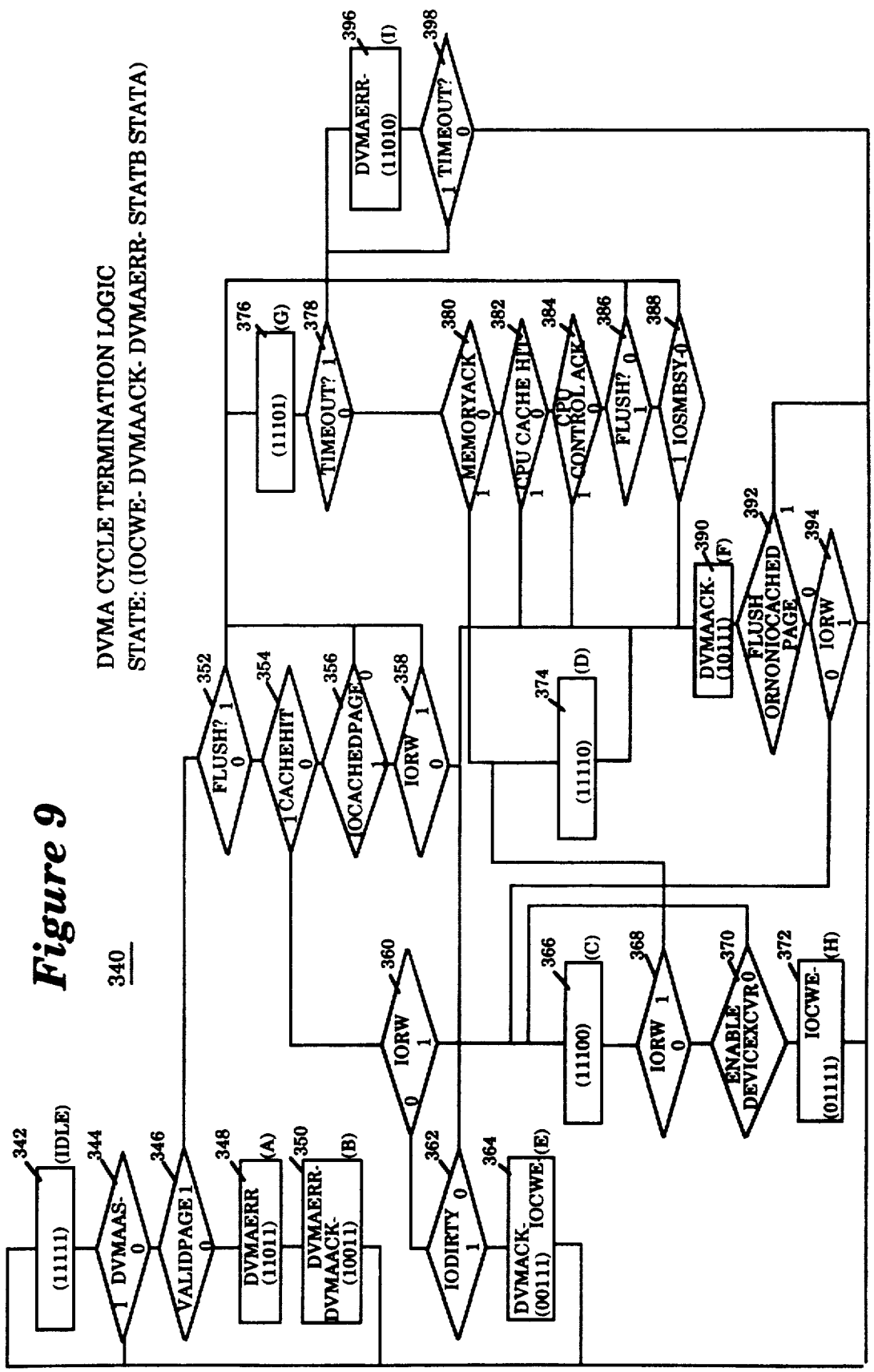
FIG. 9 is a flow diagram of DVMA cycle termination logic for the I/O cache which describes I/O Cache state machine control signals used to used to conclude a DVMA cycle to the I/O Cache.

Referring now to FIG. 9 which describes the controls for cycle termination. From the IDLE state, block 342, a test is made for VALIDPAGE, block 346. This control signal is set from I/O Mapper outputs. It is active only if the I/O Mapper indicates the DVMA page translation is valid; for write DVMA bus cycles, the page also must indicate that the DVMA device has write permission. If VALIDPAGE, block 346, is inactive, an error condition is signalled (DVMAERR-), blocks 348-350, and the cycle is completed (asserting DVMAACK-), block 350.

For FLUSH requests with VALIDPAGE, block 346, active, control passes to state G, block, 376. From state G, block 376, in general, tests are made for memory responses. For the Flush operation, these responses have no meaning, except for the test for IOSMBSY-, block 388. When this signal, set in FIG. 8, is inactive, control passes to state F, block 390. Here DVMAACK-, block 390, is asserted to conclude the arbiter state machine, FIG. 5. The control signal FLUSHORNONIOCACHEDPAGE, block 392, will be active for the Flush operation and for non-I/O cacheable DVMA cycles. This signal resets the state machine for Flush commands.

If FLUSH, block 352, is inactive, CACHEHIT, block 354, is tested to see if an I/O cache hit condition is detected. If a cache hit is detected, then IORW, block 360, is tested. For I/O cache read hits (IORW active), control passes to state C, block 360, and then to states D and F, blocks 374 and 390, where DVMAACK-, block 390, is asserted. For I/O cache write hits, (IORW, block 360, inactive), the IODIRTY signal, block 362, is tested to see if the current I/O cache entry is marked as modified (dirty). If not, control passes to state F, block 390, where DVMAACK-, block 390, is asserted. If IODIRTY, block 364, is active, then control passes to state E, block 364, where both DVMAACK- and IOCWE-, block 364, are asserted. IOCWE-, block 364, is the write enable signal to update the I/O Cache Data Array.

If FLUSH, block 352, is inactive and CACHEHIT, block 354, is inactive, then IOCACHEDPAGE, block 356, is tested. If the DVMA page is not I/O cacheable, then control passes to state G, block 376. If it is I/O cacheable, then IORW, block 358, is tested. For cacheable read cycles, control also passes to state G, block 376. In state G, block 376, in general, tests are made for memory responses. A TIMEOUT, block 378, response terminates the cycle with an error, DVMAERR-, block 396. A MEMORYACK, block 380, would be signalled for all DVMA read cycles which go to memory. It is set on the first data strobe signal. CPUCACHEHIT, block 382, is asserted for non-I/O cacheable cycles which "hit" the Central Cache and when a read consistency check for I/O cacheable data "hits" the Central Cache. CPUCONTROLACK, block 384, is asserted for non-I/O cacheable writes. When any of these conditions is true, control passes to state F, block 390, where DVMAACK-, block 390, is asserted. From state F, block 390, for cacheable write cycles, control passes to state C; for other cycles, control passes to IDLE. From state C, block 366, cacheable write cycles update the I/O Cache Data Array in state H, block 372, by asserting IOCWE-, block 372.

Referring now to FIG. 10 which describes the state machine to control the I/O cache tag update. In the IDLE state, block 402, two enable control signals are asserted: MAPOE- and FUNCOE-, block 402, MAPOE-, block 402, sets the output enable for the I/O Mapper. FUNCOE-, block 402, combines with the selected I/O device (the CPU, VMEbus, or Ethernet) to enable a virtual address onto the IORA bus. ENETGO- and FUNCOE- create EFUNCOE-, and VMEGO- and FUNCOE- create VFUNCOE-, in setting IORA(12:04). Since VMEGO- is asserted as the default device, the default address on the IORA bus is the VMEbus address.

At the start of every I/O cache bus cycle, the address for the current contents of the I/O Cache Tag Array are driven onto the IOCDB bus. This is caused by the fact that the address generator for the I/O cache is pointing to the Tag Array, and the I/O cache array is enabled on the IOCDB bus (FIG. 8, state IDLE). If the current I/O cache contents are valid and modified, then this means that the write back address is active on the IOCDB bus. At the start of each bus cycle, this address is clocked into the data transceivers between the IORA bus and the IOCDB bus. This address will be subsequently loaded into the I/O Cache Write Back Buffer for the write back cycle, as described below.

From the IDLE state, the signal FLUSHCYCLE, block 406, indicates a Flush command from the CPU has I/O arbiter priority (FIG. 5). If a FLUSHCYCLE, block 406, is asserted, then WRITEBACKNEEDED, block 418, is tested. This is determined by reading the I/O Cache Tag Array entry and examining the Valid and Modified bits. If both bits are set, then WRITEBACKNEEDED, block 418, is set active. If WRITEBACKNEEDED, block 418, is active, then WRITEBUFFERFULL, block 434, is tested. This signal is active when the I/O Cache Write Back buffer is full, pending a write back cycle to main memory. Testing WRITEBUFFERFULL, block 434, prior to state B checks, block 436, for a pending write back from a previous I/O cache cycle. While waiting in state B, block 436, for this cycle to complete, MAPOE-and FUNCOE-, block 436, are continued, and IOLTCH-, IOTAGDRV-, and TAGWRT-, block 436, are asserted. An active IOLTCH-, block 436, latches and holds the I/O address, i.e. the VMEbus and Ethernet addresses. IOTAGDRV-, block 436, enables the I/O Mapper output to drive the IOCDB bus with the new physical address, for use in updating the I/O Cache Tag Array. An active TAGWRT-, block 436, drives the Tag Array write enable.

When the WRITEBUFFERFULL, block 434, is deasserted, indicating that the previous writeback cycle is complete, the state machine control goes to state C 1, block 422. In this state, control signals MAPOE-, FUNCOE-, IOCLTCH-, IOTAGDRV-, and TAGWRT-, block 422, are asserted, along with MISS-, block 422. The actual Tag Array update occurs at the end of this cycle. The control signal MISS-, block 422, drives the Miss Address Function Generator, which generates the Valid and Modified signals, encoded in the nibble IOCDB(03:00), for both updating the I/O Cache Tag Array and for capturing the write back address in the Write Back buffers. In state C1, block 422, for the Flush cycle, MISS-, block 422, drives the Valid and Modified bits inactive for the Tag Array update. The result of state C1, block 422, for the Flush cycle is that the I/O Cache Tag Array is now marked as invalid.

Control now passes to state D, block 424. For the Flush cycle, the write back address captured in the transceivers between the IORA bus and the IOCDB bus is written into the Write Back Buffer. In state E, block 426, the control signal SEEDATA-, block 426, is set. This signal informs the I/O Cache Control Logic to change the array address bit A9 to point to the data array portion of the I/O cache array, rather than the tag array. Control passes to state F, block 428, where it is held until the cycle completes. This is indicated by the deassertion of IOSMBSY-, block 430, set in FIG. 8, and the deassertion of DVMAAS-, block 432, set in FIG. 5.

If the test for FLUSHCYCLE, block 406, from the IDLE state, block 402, is false, then CACHEHIT, block 408, is tested. CACHEHIT, block 408, is set if the DVMA cycle hits the I/O cache. If CACHEHIT, block 408, is true, then the FIRSTWRITE, block 410, control signal is tested. This signal will be active on DVMA write cycles which write to an I/O Cache entry which is currently marked as valid but not modified. If FIRSTWRITE, block 410, is true, then the tags must be updated to set the Modified bit. This update is done in state C1, block 422 with the Miss Address Function Driver driving the Valid and Modified bits into the tag array over IOCDB(03:00). If FIRSTWRITE, block 410, is inactive for the DVMA cycle which hits the I/O cache, then no tag update is required. Control passes to state F, block 428, where it remains until the cycle is complete.

If CACHHIT, block 408, is not true, implying an I/O cache miss, then the control signal IOCACHEDPAGE, block 412, is tested. This signal is read from the I/O Mapper. If the page is not I/O cacheable, then control passes to state C2, block 420. In C2, block 420, MAPOE-, block 420, is asserted so that the DVMA physical address can be written into the IOC Miss Address Register. Control then passes through states D and E to state F, blocks 424–428, where the state machine waits for the conclusion of the cycle.

If IOCACHEDPAGE, block 412, is active, then the signal WRITEBACKNEEDED, block 414, is tested. WRITEBACKNEEDED, block 414, indicates the presence on a valid and modified I/O cache entry present in the array. If this signal is active, the control flow is treated as in the Flush case. First, WRITEBACK-FULL, block 434, is tested to see if the Write Back buffer is still busy from a previous write back cycle. If so, control loops in state B, block 436, until the buffer is cleared. Then control passes to state C1, block 422. In state C1, block 422, the tags are updated, with the tag address driven from the I/O Mapper through asserting the buffer enable IOTAGDRV-, block 422. The MISS-, signal, block 422, informs the Miss Address Function Driver to update the I/O cache Valid and Modified bits as appropriate, depending on whether the bus cycle is a read or write cycle. Control then passes to state D, block 424, where the write back address is written into the Write Back Buffer, as in the case for the Flush cycle. Next control passes to states E and F, blocks 426 and 428, to await the conclusion of the cycle.

If WRITEBACKNEEDED, block 414, is inactive, then the control signal IORW, block 416, is tested. This signal will be active for I/O cache read cycles. If the DVMA cycle is a read cycle, then in order to assure data consistency for I/O cache data read from memory, the state machine tests whether the signal WRITEBUFFERFULL, block 434, is active. This assures that any pending write back cycle will complete before data for the DVMA read cycle is returned. Looping in state B, block 436, until the write back cycle is complete, control can now pass to state C1, block 422. Here IOTAGDRV-, block 422, enables the physical address from the I/O Mapper onto the IOCDB bus, while the MISS-, block 422, input to the Miss Address Function Driver, is asserted. The function drive sets the Valid bit in IOCDB(03:00). TAGWRT-, block 422, updates the tag array entry. Control now passes through states D and E to state F, blocks 424–428, where the state machine loops until the end of the cycle.

If IORW, block 416, is inactive, indicating a DVMA write cycle, then control passes directly to state C1, block 422, (since WRITEBACKNEEDED is inactive). Here the tags are updated, as above, except that the Miss Address Function Driver sets both the Valid and Modified bits active. The write cycle concludes just as the DVMA read cycle, above.

We claim:

1. In a computer system including a central processing unit (CPU), a main memory, a plurality of input/output (I/O) devices, and an operating system, wherein said I/O devices transfer data directly between said I/O devices and said main memory without being under the control of said CPU, an I/O cache for caching said I/O data being transferred between said I/O devices and said main memory, said I/O cache comprising:

a) I/O cache data array means coupled to said main memory, said CPU, said I/O devices including a first and a second plurality of I/O cache lines for caching a first and second subset of said I/O data, said first and second subsets of said I/O data being transferred directly between said main memory and I/O devices of a first and a second type respectively, said I/O devices being classified by said operating system into at least a first and a second types, each I/O cache line of said first plurality of I/O cache lines being mapped to a memory page of said main memory allocated to an I/O device of said first type, each of said I/O devices of said first type being allocated at least one I/O cache mapped memory page dynamically by said operating system, each I/O cache line of said second plurality of I/O cache lines being grouped with at least one other I/O cache line of said second plurality of I/O cache lines, each group of I/O cache lines of said second plurality of I/O cache lines being mapped to a plurality of memory pages of said main memory allocated to an I/O device of said second type, each of said I/O devices of said second type being allocated a plurality of I/O cache mapped memory pages statically by said operating system;

b) I/O cache tag array means coupled to said CPU and said I/O devices including a plurality of I/O tag entries for storing addresses and associated control information for said first and second plurality of I/O cache lines, each of said I/O tag entries having at least one I/O tag, each of said I/O tags storing an address and associated control information for one of said first and second plurality of I/O cache lines;

c) I/O mapper means coupled to said CPU and said I/O devices including a plurality of indicators corresponding to memory pages of said main memory for indicating I/O cacheability of said corresponding memory pages, each caheability indicator corresponding to one of said I/O cache mapped memory pages allocated to one of said I/O devices of said first and second types being marked cacheable by said operating system upon allocating the specific memory page to the I/O device of said first and second types; and d) I/O control logic means coupled to said CPU, said I/O devices, said I/O cache data array means, said I/O cache tag array means, and said I/O cache mapper means for arbitrating accesses by said CPU and said I/O devices to said I/O cache data array means, said I/O cache tag array means and I/O cache mapper means, and controlling said I/O cache data array means, said I/O cache tag array means and I/O cache mapper means.

2. The I/O cache as set forth in claim 1, wherein, said I/O data being transferred directly between said I/O devices and said main memory without being under the control of said CPU further comprises a third subset of I/O data being transferred between I/O devices of a third type and said main memory without being cached by said I/O cache;

each of said I/O devices of said third type is allocated memory locations of non-I/O cache mapped memory pages of said main memory by said operating system.

each indicator of said I/O mapper means corresponding to one of said non-I/O cache mapped memory pages being marked non-cacheable by said operating system by default.

3. The I/O cache as set forth in claim 1, wherein, said I/O cache control logic means comprises I/O cache miss address function driver means coupled to said I/O mapper means for driving address bits with new control information to said I/O mapper means when said I/O cache control logic means accesses said I/O mapper means to update said I/O mapper means.

4. The I/O cache as set forth in claim 1, wherein, said I/O cache control logic means comprises I/O write back and update logic means coupled to said I/O cache tag array for driving address bits and new tag information to said I/O cache tag array when said I/O cache control logic means updates said I/O cache tag array, said I/O write back and update logic means being also used for determining whether an I/O cache line is to be written back to said memory when said I/O cache control logic means accesses said I/O cache tag array for address matching.

5. The I/O cache as set forth in claim 1, wherein,
said I/O devices address said main memory in virtual addresses;
said I/O cache tag array means stores physical addresses; and
said I/O mapper means further comprises translation logic for translating said virtual addresses into physical addresses.

* * * * *